United States Patent
Monfette et al.

(10) Patent No.: US 8,798,882 B2
(45) Date of Patent: *Aug. 5, 2014

(54) METHOD OF CONTROLLING A HYDRAULIC CONTINUOUSLY VARIABLE TRANSMISSION

(75) Inventors: David Monfette, Sherbrooke (CA); Jean-Philippe Desbiens, Sherbrooke (CA); Roger Rioux, Sherbrooke (CA)

(73) Assignee: Consortium de Recherche BRP—Universite de Sherbrooke S.E.N.C., Sherbrooke, Quebec ( * ) Notice: Subject to any disclaimer, the term of this patent is extended or adjusted under 35 U.S.C. 154(b) by 103 days.

This patent is subject to a terminal disclaimer.

(21) Appl. No.: 13/430,254

(22) Filed: Mar. 26, 2012

(65) Prior Publication Data

US 2013/0080007 A1    Mar. 28, 2013

Related U.S. Application Data

(63) Continuation-in-part of application No. 13/496,387, filed as application No. PCT/CA2009/001301 on Sep. 15, 2009, now Pat. No. 8,645,035.

(51) Int. Cl.
G06F 7/00    (2006.01)

(52) U.S. Cl.
USPC ............................................. 701/61; 474/28

(58) Field of Classification Search
USPC ......... 701/61, 54, 58, 60; 474/18, 28; 477/43, 477/45–46, 48–49
See application file for complete search history.

(56) References Cited

U.S. PATENT DOCUMENTS

| | | | |
|---|---|---|---|
| 3,207,280 A | 9/1965 | Dangauthier | |
| 4,563,734 A | 1/1986 | Mori et al. | |
| 5,269,726 A | 12/1993 | Swanson et al. | |
| 5,667,448 A | 9/1997 | Friedmann | |
| 5,711,730 A | 1/1998 | Friedmann et al. | |
| 5,908,367 A | 6/1999 | Tomkinaga et al. | |
| 6,361,470 B1 | 3/2002 | Friedmann et al. | |
| 7,512,474 B2 | 3/2009 | Tabata et al. | |
| 7,582,041 B2 | 9/2009 | Suzuki et al. | |
| 7,809,485 B2 | 10/2010 | Kobayashi et al. | |
| 8,047,960 B2 * | 11/2011 | Asaoka .......................... | 477/43 |
| 2006/0105868 A1 | 5/2006 | Moormann | |

* cited by examiner

*Primary Examiner* — Thomas Black
*Assistant Examiner* — Luke Huynh
(74) *Attorney, Agent, or Firm* — BCF LLP

(57) ABSTRACT

A method of controlling a hydraulic CVT of a vehicle comprises: determining a speed of rotation of a driving shaft; determining a speed of rotation of a driven shaft; determining a ratio of the speed of rotation of the driving shaft versus the speed of rotation of the driven shaft; determining an engine torque; determining a base clamping force to be applied by the driving pulley onto the belt based on the ratio and the engine torque; determining a desired speed of rotation of the driving shaft; determining a corrective clamping force by comparing the speed of rotation of the driving shaft to the desired speed of rotation of the driving shaft; and controlling a hydraulic pressure applied to a movable sheave to apply a sum of the base and corrective clamping forces onto the belt. A vehicle having a CVT controlled by the method is also disclosed.

21 Claims, 15 Drawing Sheets

CALIBRATION MAP

| TPS (%) | \ SPEED (km/h) | 0 | 20 | 40 | 60 | 80 | 100 | 120 | 140 | 160 | 180 |
|---|---|---|---|---|---|---|---|---|---|---|---|
| 0 | | 1800 | 1800 | 1850 | 1900 | 2800 | 3500 | 4000 | 4000 | 4000 | 4000 |
| 5 | | 1800 | 2000 | 1900 | 1900 | 2800 | 3500 | 4500 | 4000 | 4500 | 4500 |
| 7 | | 1800 | 2200 | 2400 | 2800 | 3200 | 4000 | 4800 | 4500 | 5000 | 5000 |
| 10 | | 1800 | 2500 | 2600 | 3600 | 4200 | 4800 | 5200 | 5500 | 5500 | 5500 |
| 15 | | 1800 | 2500 | 2800 | 4000 | 4300 | 5200 | 5600 | 6500 | 6000 | 6500 |
| 20 | | 1800 | 2500 | 3500 | 4500 | 4500 | 5500 | 6500 | 5500 | 6500 | 7000 |
| 25 | | 1800 | 3500 | 4000 | 5000 | 5500 | 6000 | 6800 | 6500 | 7200 | 7200 |
| 40 | | 1800 | 4000 | 4500 | 6500 | 6800 | 6500 | 7000 | 7500 | 7500 | 7500 |
| 60 | | 1800 | 4500 | 5000 | 7000 | 7200 | 7500 | 7500 | 7800 | 7600 | 7700 |
| 100 | | 1800 | 5000 | 5500 | 7700 | 7800 | 7800 | 7800 | 7800 | 7800 | 7800 |

*FIG. 12A*

CALIBRATION MAP

| TPS (%) | \ SPEED (km/h) | 0 | 20 | 40 | 60 | 80 | 100 | 120 | 140 | 160 | 180 |
|---|---|---|---|---|---|---|---|---|---|---|---|
| 0 | | 2500 | 4000 | 4000 | 4000 | 4000 | 4000 | 4000 | 4000 | 4000 | 4000 |
| 5 | | 2500 | 3600 | 4000 | 4300 | 4500 | 4500 | 4500 | 4000 | 4500 | 4500 |
| 7 | | 2800 | 3600 | 4000 | 4500 | 4800 | 5000 | 5000 | 5000 | 5000 | 5000 |
| 10 | | 3300 | 4000 | 4300 | 4700 | 5000 | 5500 | 5500 | 5500 | 5500 | 5500 |
| 15 | | 4000 | 4500 | 4500 | 4900 | 5200 | 6000 | 6500 | 6500 | 6500 | 6000 |
| 20 | | 4500 | 5200 | 5500 | 5500 | 5800 | 6500 | 7200 | 7200 | 7200 | 6500 |
| 25 | | 5200 | 5800 | 6200 | 6000 | 6800 | 7200 | 7600 | 7600 | 7600 | 7000 |
| 40 | | 5500 | 6200 | 6800 | 6500 | 7400 | 7600 | 7750 | 7750 | 7750 | 7500 |
| 60 | | 6500 | 6800 | 7200 | 7200 | 7600 | 7700 | 7800 | 7800 | 7800 | 7800 |
| 100 | | 7000 | 7500 | 7600 | 7800 | 7800 | 7800 | 7800 | 7800 | 7800 | 7800 |

*FIG. 12B*

ENGINE TORQUE MAP

| TPS (%) | ENGINE RPM | | | | | | | | | |
|---|---|---|---|---|---|---|---|---|---|---|
| | 1500 | 2000 | 3000 | 3500 | 4000 | 4500 | 5000 | 6000 | 7000 | 8000 |
| 0 | 0.0 | 5.0 | 10.0 | 15.0 | 20.0 | 25.0 | 30.0 | 35.0 | 40.0 | 45.0 |
| 5 | 5.0 | 10.0 | 15.0 | 20.0 | 25.0 | 30.0 | 35.0 | 40.0 | 45.0 | 50.0 |
| 7.5 | 10.0 | 15.0 | 20.0 | 25.0 | 30.0 | 35.0 | 40.0 | 45.0 | 50.0 | 55.0 |
| 10 | 20.0 | 25.0 | 30.0 | 35.0 | 40.0 | 45.0 | 50.0 | 55.0 | 60.0 | 65.0 |
| 12.5 | 25.0 | 30.0 | 35.0 | 40.0 | 45.0 | 50.0 | 55.0 | 60.0 | 65.0 | 70.0 |
| 15 | 30.0 | 35.0 | 40.0 | 45.0 | 50.0 | 55.0 | 60.0 | 65.0 | 70.0 | 75.0 |
| 20 | 40.0 | 45.0 | 50.0 | 55.0 | 60.0 | 65.0 | 70.0 | 75.0 | 80.0 | 85.0 |
| 30 | 50.0 | 55.0 | 60.0 | 65.0 | 70.0 | 75.0 | 80.0 | 85.0 | 90.0 | 95.0 |
| 40 | 60.0 | 65.0 | 70.0 | 75.0 | 80.0 | 85.0 | 90.0 | 95.0 | 100.0 | 105.0 |
| 60 | 80.0 | 85.0 | 90.0 | 95.0 | 100.0 | 105.0 | 110.0 | 115.0 | 120.0 | 125.0 |
| 100 | 100.0 | 105.0 | 110.0 | 115.0 | 120.0 | 125.0 | 130.0 | 135.0 | 140.0 | 145.0 |

*FIG. 13*

CLAMPING FORCE MAP

| RATIO | TORQUE (Nm) | | | | | | | | | | |
|---|---|---|---|---|---|---|---|---|---|---|---|
| | 0 | 10 | 20 | 30 | 40 | 50 | 60 | 70 | 80 | 90 | 100 |
| 0.8 | 500 | 800 | 1100 | 1400 | 1700 | 2000 | 2300 | 2600 | 2900 | 3200 | 3500 |
| 1 | 600 | 900 | 1200 | 1500 | 1800 | 2100 | 2400 | 2700 | 3000 | 3300 | 3600 |
| 1.3 | 700 | 1000 | 1300 | 1600 | 1900 | 2200 | 2500 | 2800 | 3100 | 3400 | 3700 |
| 1.5 | 800 | 1100 | 1400 | 1700 | 2000 | 2300 | 2600 | 2900 | 3200 | 3500 | 3800 |
| 1.7 | 900 | 1200 | 1500 | 1800 | 2100 | 2400 | 2700 | 3000 | 3300 | 3600 | 3900 |
| 2 | 1000 | 1300 | 1600 | 1900 | 2200 | 2500 | 2800 | 3100 | 3400 | 3700 | 4000 |
| 2.25 | 1100 | 1400 | 1700 | 2000 | 2300 | 2600 | 2900 | 3200 | 3500 | 3800 | 4100 |
| 2.5 | 1200 | 1500 | 1800 | 2100 | 2400 | 2700 | 3000 | 3300 | 3600 | 3900 | 4200 |
| 3 | 1300 | 1600 | 1900 | 2200 | 2500 | 2800 | 3100 | 3400 | 3700 | 4000 | 4300 |
| 3.5 | 1400 | 1700 | 2000 | 2300 | 2600 | 2900 | 3200 | 3500 | 3800 | 4100 | 4400 |
| 4 | 1500 | 1800 | 2100 | 2400 | 2700 | 3000 | 3300 | 3600 | 3900 | 4200 | 4500 |

METHOD OF CONTROLLING A HYDRAULIC CONTINUOUSLY VARIABLE TRANSMISSION

CROSS-REFERENCE

The present application is a Continuation-In-Parts of U.S. patent application Ser. No. 13/496,387, filed Mar. 15, 2012 which is a National Phase Entry of International Patent Application No. PCT/CA2009/001301, filed Sep. 15, 2009, the entirety of both of which is incorporated herein by reference.

FIELD OF THE INVENTION

The present invention relates to a method of controlling a hydraulic continuously variable transmission and to a vehicle having a hydraulic continuously variable transmission controlled by the method.

BACKGROUND

Conventional snowmobile drive trains incorporate a continuously variable transmission (CVT) having a driving pulley that is operatively coupled to the engine crankshaft and a driven pulley coupled to a driven shaft. The driving pulley acts as a clutch and includes a centrifugally actuated adjusting mechanism through which the drive ratio of the CVT is varied progressively as a function of the engine speed and the output torque at the driven pulley. Typically, the driven shaft is a transverse jackshaft which drives the input member of a chain and sprocket reduction drive. The output of reduction drive is coupled to one end of the axle on which are located the drive track drive sprocket wheels.

Although a centrifugal CVT provides many advantages, the fact that the drive ratio of the CVT is directly related to the engine speed causes some disadvantages. One such disadvantage is that the calibration of the driving pulley is always linked with the maximum power output of the engine. Although this results in great acceleration characteristics for the snowmobile, when the snowmobile operates at cruising speeds it results in the engine operating at a greater speed than necessary, high fuel consumption, high noise levels, and a lot of vibrations being transmitted to the riders of the snowmobile.

Therefore, there is a need for a CVT having a drive ratio which is not directly related to the engine speed.

SUMMARY

It is an object of the present invention to ameliorate at least some of the inconveniences present in the prior art.

It is also an object of the present invention to provide method of controlling a hydraulic continuously variable transmission.

It is also an object of the present invention to provide a vehicle having a hydraulic continuously variable transmission controlled by the above method.

In one aspect, a method of controlling a hydraulic continuously variable transmission of a vehicle is provided. The continuously variable transmission includes a driving pulley disposed on a driving shaft for rotation therewith, a driven pulley disposed on a driven shaft for rotation therewith, and a belt operatively connecting the driving pulley with the driven pulley. The driving pulley including a fixed sheave, a movable sheave, and a spring biasing the movable sheave away from the fixed sheave. The driving shaft is driven by an engine of the vehicle. The method comprises: determining a drive ratio of the continuously variable transmission; and controlling a hydraulic pressure applied to the movable sheave to apply a total clamping force onto the belt that is less than a clamping force necessary to cause the belt to rotate synchronously with the driving pulley when the drive ratio corresponds to a low gear ratio condition.

In a further aspect, determining the drive ratio includes: determining a speed of rotation of the driving shaft; and determining a speed of rotation of the driven shaft. The drive ratio is a ratio of the speed of rotation of the driving shaft versus the speed of rotation of the driven shaft In an additional aspect, when the drive ratio corresponds to the low gear ratio condition, a speed of rotation of the driving pulley is greater than a speed of rotation of the belt and the belt slips relative to the driving pulley.

In a further aspect, a difference in rotation speed between the driving pulley and the belt decreases as the drive ratio decreases.

In an additional aspect, when the drive ratio corresponds to the low gear ratio condition, the belt rotates synchronously with the driven pulley.

In a further aspect, the method also comprises: determining an engine torque; determining a base clamping force to be applied by the driving pulley onto the belt based on the drive ratio and the engine torque; determining a desired speed of rotation of the driving shaft; and determining a corrective clamping force by comparing the speed of rotation of the driving shaft to the desired speed of rotation of the driving shaft. The total clamping force is a sum of the base clamping force and the corrective clamping force.

In an additional aspect, the method also comprises determining a position of a throttle valve of the engine. The engine torque is determined using a map based on the position of the throttle valve and the speed of rotation of the driving shaft.

In a further aspect, the corrective clamping force is determined using a proportional-integral-derivative controller.

In an additional aspect, the method also comprises: determining a position of a throttle valve of the engine; and determining a speed of the vehicle. The desired speed of rotation of the driving shaft is determined using a calibration map based on the position of the throttle valve and the speed of the vehicle.

In a further aspect, the driving pulley includes a CVT chamber and the vehicle includes a hydraulic fluid reservoir and a pump. The pump supplies hydraulic fluid to the CVT chamber, and hydraulic pressure in the CVT chamber biases the movable sheave toward the fixed sheave. Controlling a hydraulic pressure applied to the movable sheave includes controlling a position of a proportional pressure relief valve controlling fluid communication between the CVT chamber and the reservoir.

In another aspect, a vehicle is provided that has a frame, an engine mounted to the frame, the engine having a throttle valve controlling a flow of air to the engine, a ground engaging element mounted to the frame for propelling the vehicle, a driving shaft extending from the engine and being driven by the engine, a driven shaft operatively connected to ground engaging element for driving the ground engaging element, a hydraulic fluid reservoir, a pump fluidly communicating with the reservoir, and a continuously variable transmission operatively connecting the driving shaft with the driven shaft. The continuously variable transmission includes: a driving pulley disposed on the driving shaft for rotation therewith, a driven pulley disposed on the driven shaft for rotation therewith, and a belt operatively connecting the driving pulley with the driven pulley. The driving pulley includes: a fixed sheave disposed on the driving shaft for rotation therewith, a movable sheave disposed on the driving shaft for rotation therewith, the belt being disposed between the fixed sheave and the movable sheave, a spring biasing the movable sheave away from the fixed sheave; and a CVT chamber fluidly communicating with the pump. The pump supplies hydraulic fluid from the reservoir to the CVT chamber to create a hydraulic pressure in the CVT chamber, and the hydraulic pressure in the CVT chamber biases the movable sheave toward the fixed sheave. A control unit determines a hydraulic pressure to be created in the CVT chamber. The hydraulic pressure determined by the control unit causes the movable sheave to apply a total clamping force onto the belt that is less than a clamping force necessary to cause the belt to rotate synchronously with the driving pulley when a drive ratio of the continuously variable transmission corresponds to a low gear ratio condition.

In an additional aspect, when the drive ratio corresponds to the low gear ratio condition, a speed of rotation of the driving pulley is greater than a speed of rotation of the belt and the belt slips relative to the driving pulley.

In a further aspect, a difference in rotation speed between the driving pulley and the belt decreases as the drive ratio decreases.

In an additional aspect, when the drive ratio corresponds to the low gear ratio condition, the belt rotates synchronously with the driven pulley.

In a further aspect, a proportional pressure relief valve selectively communicates the CVT chamber with the reservoir. A valve actuator is operatively associated with the proportional pressure relief valve for controlling a position of the proportional pressure relief valve. The control unit is electronically connected to the valve actuator. The control unit sends a signal to the valve actuator to control the position of the proportional pressure relief valve. A driving shaft speed sensor electronically communicates with the control unit. The driving shaft speed sensor sends a signal representative of a speed of rotation of the driving shaft to the control unit. A throttle position sensor electronically communicates with the control unit. The throttle position sensor sends a signal representative of a position of the throttle valve to the control unit. A vehicle speed sensor electronically communicates with the control unit. The vehicle speed sensor sends a signal representative of a speed of the vehicle to the control unit. The control unit determines a speed of rotation of the driven shaft based on the signal received from the vehicle speed sensor. The control unit determines an engine torque based on the signals received from the driving shaft speed sensor and the throttle position sensor. The control unit determines a desired speed of rotation of the driving shaft based on the signals received from the throttle position sensor and the vehicle speed sensor. The control unit determines a base clamping force to be applied by the driving pulley onto the belt based on the engine torque and a ratio of the speed of rotation of the driving shaft versus the speed of rotation of the driven shaft. The control unit determines a corrective clamping force by comparing the speed of rotation of the driving shaft to the desired speed of rotation of the driving shaft. The signal from the control unit to the valve actuator to control the position of the proportional pressure relief valve being based on a sum of the base clamping force and the corrective clamping force. The sum corresponds to the total clamping force.

In an additional aspect, the driving shaft is a crankshaft of the engine.

In a further aspect, the belt is made of a non-metallic material and has a generally V-shaped cross-section.

In a further aspect, the driven pulley includes a torque sensitive mechanism.

In another aspect, a method of controlling a hydraulic continuously variable transmission of a vehicle is provided. The continuously variable transmission includes: a driving pulley disposed on a driving shaft for rotation therewith, a driven pulley disposed on a driven shaft for rotation therewith, and a belt operatively connecting the driving pulley with the driven pulley. The driving pulley includes a fixed sheave, a movable sheave, and a spring biasing the movable sheave away from the fixed sheave. The driving shaft is driven by an engine of the vehicle. The method comprises: determining a vehicle speed; and controlling a hydraulic pressure applied to the movable sheave to apply a total clamping force onto the belt that is less than a clamping force necessary to cause the belt to rotate synchronously with the driving pulley when the vehicle speed corresponds to a low vehicle speed.

In an additional aspect, when the vehicle speed corresponds to the low vehicle speed, a speed of rotation of the driving pulley is greater than a speed of rotation of the belt and the belt slips relative to the driving pulley.

In a further aspect, when the vehicle speed corresponds to the low vehicle speed, the belt rotates synchronously with the driven pulley.

For purposes of this application, the terms related to spatial orientation such as forwardly, rearwardly, left and right, are as they would normally be understood by a driver of a vehicle sitting thereon in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 12A is an example of a calibration map used in the method of controlling the CVT;

FIG. 12B is an example of another calibration map used in the method of controlling the CVT;

FIG. 13 is an example of an engine torque map used in the method of controlling the CVT; and FIG. 14 is an example of a clamping force map used in the method of controlling the CVT.

DETAILED DESCRIPTION

The present invention will be described with respect to a snowmobile. However, it is contemplated that the invention could be used in other vehicles, such as, but not limited to, a motorcycle, a three-wheel vehicle and an all-terrain vehicle (ATV).

Figure 1:
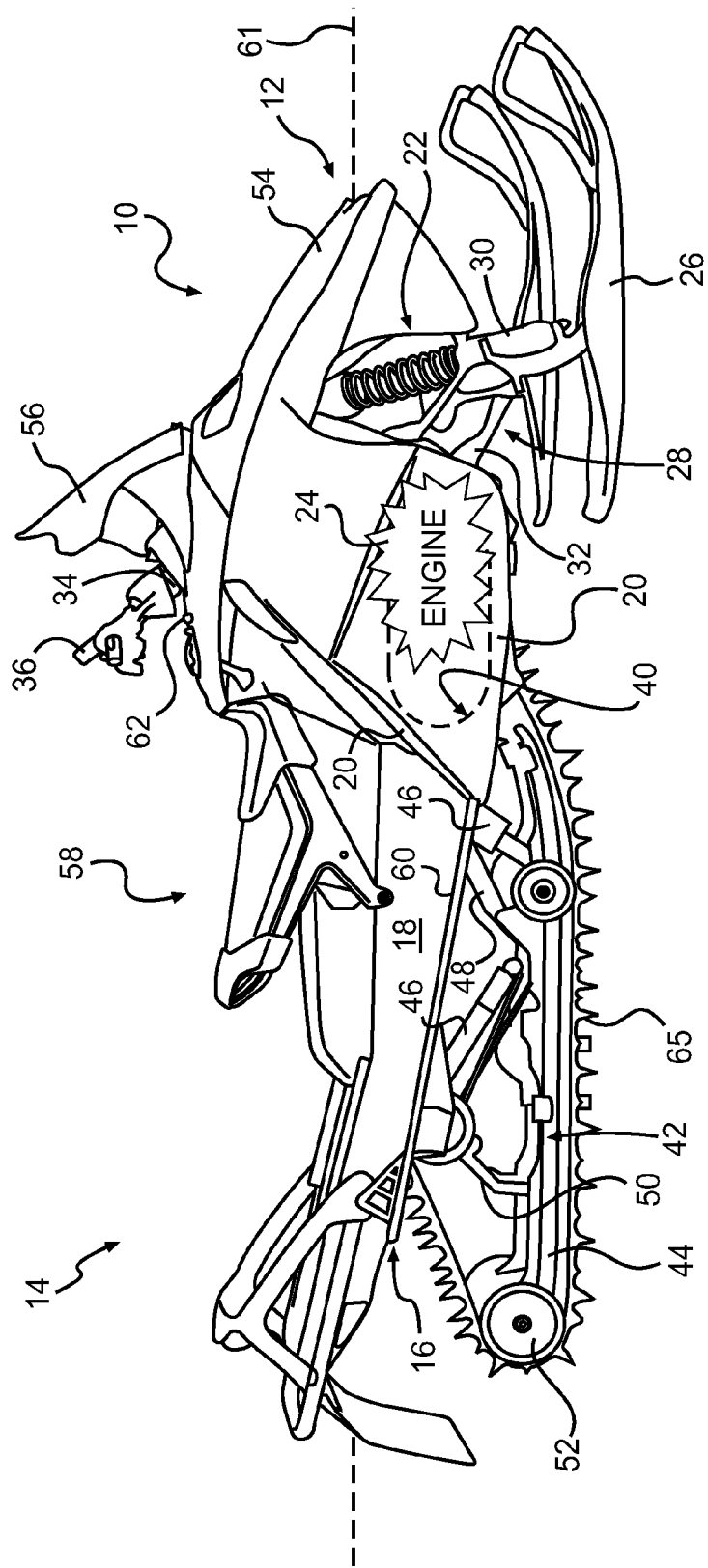
FIG. 1 is a right side elevation view of a snowmobile.

Turning now to FIG. 1, a snowmobile 10 includes a forward end 12 and a rearward end 14 which are defined consistently with a forward travel direction of the vehicle. The snowmobile 10 includes a frame 16 which normally includes a tunnel 18, an engine cradle portion 20 and a front suspension assembly portion 22. The tunnel 18 generally consists of sheet metal bent in an inverted U-shape which extends rearwardly along the longitudinal axis 61 of the snowmobile 10 and is connected at the front to the engine cradle portion 20. An engine 24, which is schematically illustrated in FIG. 1, is carried by the engine cradle portion 20 of the frame 16. The engine 24 has an engine casing 25 (FIG. 2). The engine casing 25 consists of various parts fastened or otherwise connected to each other. A steering assembly is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints 33 (FIG. 2B) for operatively connecting the respective skis 26 to a steering column 34. A steering device such as a handlebar 36, positioned forward of a rider, is attached to the upper end of the steering column 34 to allow the rider to rotate the ski legs 30 and thus the skis 26, in order to steer the snowmobile 10.

An endless drive track 65 is positioned at the rear end 14 of the snowmobile 10. The drive track 65 is disposed generally under the tunnel 18, and is operatively connected to the engine 24 through CVT 40 illustrated schematically by broken lines and which will be described in greater detail below. The endless drive track 65 is driven to run about a rear suspension assembly 42 for propulsion of the snowmobile 10. The rear suspension assembly 42 includes a pair of slide rails 44 in sliding contact with the endless drive track 65. The rear suspension assembly 42 also includes one or more shock absorbers 46 which may further include coil springs (not shown) surrounding the shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24 and the CVT 40, thereby providing an external shell that protects the engine 24 and the CVT 40, and can also be decorated to make the snowmobile 10 more aesthetically pleasing. The fairings 54 include a hood and one or more side panels which can be opened to allow access to the engine 24 and the CVT 40 when this is required, for example, for inspection or maintenance of the engine 24 and/or the CVT 40. In the particular snowmobile 10 shown in FIG. 1, the side panels can be opened along a vertical axis to swing away from the snowmobile 10. A windshield 56 is connected to the fairings 54 near the front end 12 of the snowmobile 10 or alternatively directly to the handlebar 36. The windshield 56 acts as a wind screen to lessen the force of the air on the rider while the snowmobile 10 is moving.

The engine 24 is an internal combustion engine that is supported on the frame 16 and is located at the engine cradle portion 20. In the present embodiment, the engine 24 is a four-stroke, three-cylinder engine. However, the internal construction of the engine 24 may be of any known type and can operate on the diesel, the two-stroke or four-stroke principle. The engine 24 drives a crankshaft 57 (FIG. 4) that rotates about a horizontally disposed axis that extends generally transversely to the longitudinal axis 61 of the snowmobile 10. The crankshaft 57 drives the CVT 40 for transmitting torque to the endless drive track 65 for propulsion of the snowmobile 10 as described in greater detail below.

A straddle-type seat 58 is positioned atop the frame 16. A rear portion of the seat 58 may include a storage compartment or can be used to accommodate a passenger seat. Two footrests 60 are positioned on opposite sides of the snowmobile 10 below the seat 58 to accommodate the driver's feet.

Figure 2A:
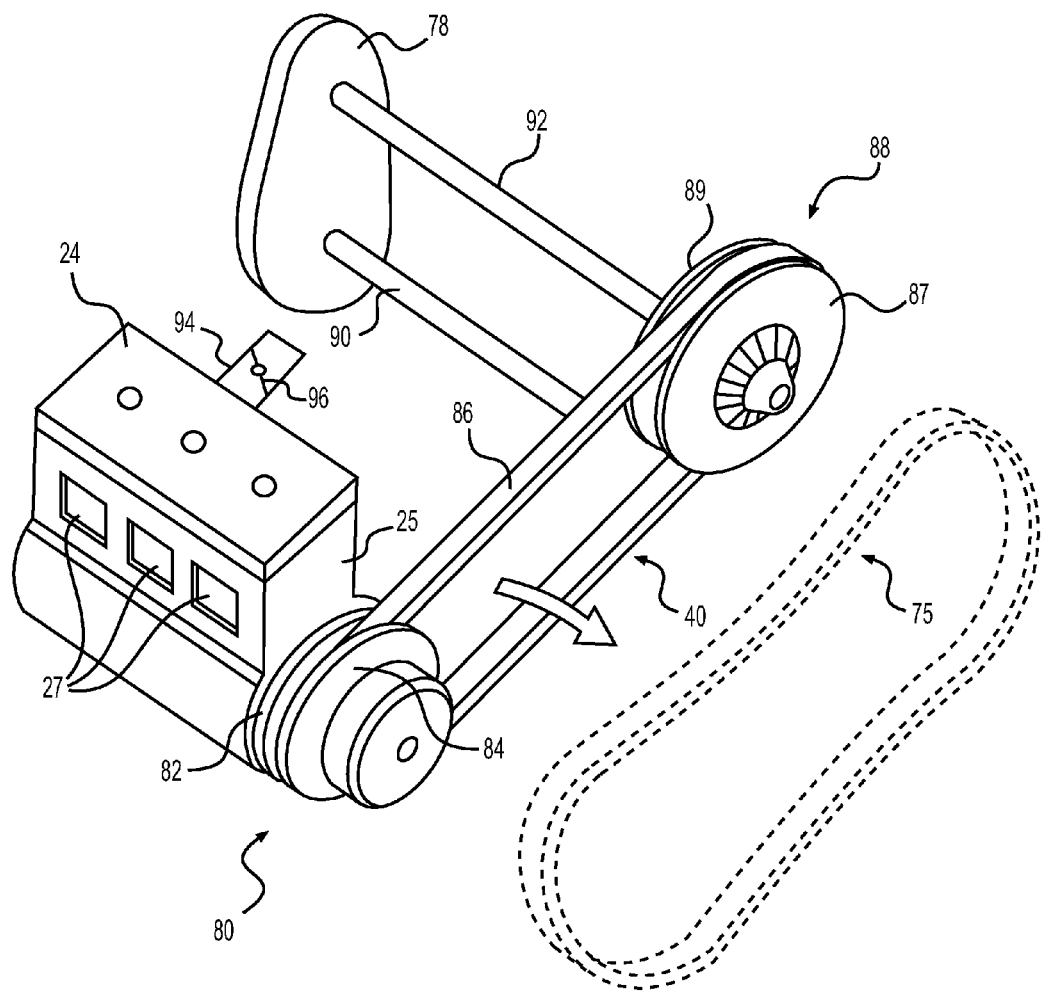
FIG. 2A is a perspective view, taken from a front, left side, of a powertrain of the snowmobile of FIG. 1.
Figure 2B:
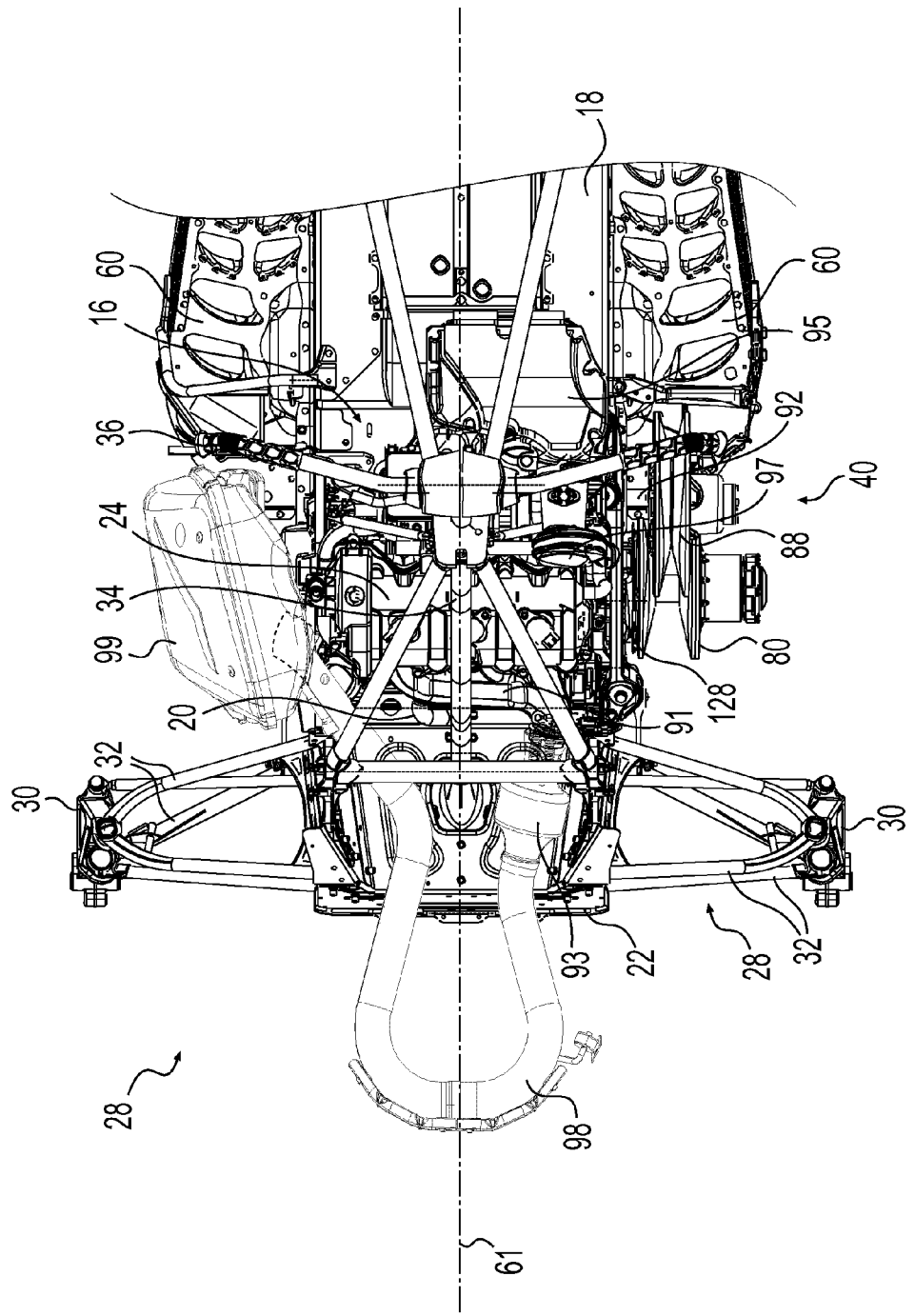
FIG. 2B is a top plan view of a front portion of a frame, the powertrain, air intake system and exhaust system of the snowmobile of FIG. 1.

FIG. 2A illustrates schematically a powertrain 75 of the snowmobile 10. The powertrain 75 includes the engine 24, the CVT 40 and a fixed ratio reduction drive 78. A throttle body 94 having a throttle valve 96 therein is connected to air intake ports of the engine 24 to control the flow of air to the engine 24. The throttle body 94 is connected to an airbox 95 that is itself connected to an intake pipe 97 having a forwardly facing inlet (see FIG. 2B). In operation, air enters the intake pipe 97, flows through the airbox 95 where it is filtered and is then supplied to the throttle body 94. It is contemplated that the throttle body 94 could be replaced by a carburetor. Exhaust gases exit the engine 24 through exhaust ports 27 (FIG. 2A). From the exhaust ports 27, the exhaust gases passes through an exhaust system and are then released in the atmosphere. As can be seen in FIG. 2B, the exhaust system consists of an exhaust manifold 91 connected to the front of the engine 24 to collect the gases from the ports 27, a pre-muffler 93 connected downstream of the manifold 91, a generally U-shaped exhaust pipe 98 connected downstream of the pre-muffler 93, and a muffler 99 connected downstream of the exhaust pipe 98. As can be seen, the pre-muffler 93 and the muffler 99 are disposed on opposite sides of the longitudinal centerline 61. Additional details regarding the exhaust system can be found in United States Patent Publication No. US 2010/0108427 A1, published May 6, 2010, the entirety of which is incorporated herein by reference. It is contemplated that the snowmobile 10 could be provided with an exhaust system that is different from the one described above.

The CVT 40 includes a driving pulley 80 coupled, directly or indirectly, to rotate with the crankshaft 57 of the engine 24 and a driven pulley 88 coupled to one end of a transversely mounted jackshaft 92 which is supported on the frame 16 through bearings. As illustrated, the transversely mounted jackshaft 92 traverses the width of the engine 24. The opposite end of the transversely mounted jackshaft 92 is connected to the input member of the reduction drive 78 and the output member of the reduction drive 78 is connected to a drive axle 90 carrying sprocket wheels (not shown) that form a driving connection with the drive track 65.

The driving pulley 80 of the CVT 40 includes a pair of opposed frustoconical belt drive sheaves 82 and 84 between which the drive belt 86 is located. The drive belt 86 has a generally V-shaped cross-section. In the present embodiment, the drive belt 86 is mostly made of rubber. In one exemplary embodiment, the drive belt 86 is made of rubber with embedded Kevlar™ cord and bonding agents. However, it is contemplated that the belt 86 could be made of other polymers and/or non-metallic material and combinations thereof. The driving pulley 80 will be described in greater detail below. The driven pulley 88 includes a pair of frustoconical belt drive sheaves 87 and 89 between which the drive belt 86 is located. The driving pulley 80 engages the drive belt 86. The torque being transmitted to the driven pulley 88 provides the necessary clamping force on the belt 86 through its torque sensitive mechanical device in order to efficiently transfer torque to the further powertrain components. The effective diameters of the driving pulley 80 and the driven pulley 88 are the result of the equilibrium of forces on the drive belt 86 from the hydraulic system of the driving pulley 80 and the torque sensitive mechanism of the driven pulley 88. U.S. Pat. No. 7,674,197 B2, issued Mar. 9, 2010, and entitled "Continuously Variable Transmission Driven-Pulley Cam Having Three Cam Surfaces and Roller Therefor", the entirety of which is incorporated herein by reference, discloses possible embodiments of a torque sensitive mechanism for the driven pulley 88.

In this particular example, the driving pulley 80 rotates at the same speed as the crankshaft 57 of the engine 24 whereas the speed of rotation of the transverse jackshaft 92 is determined in accordance with the instantaneous ratio of the CVT 40, and the drive axle 90 rotates at a lower speed than the transverse jackshaft 92 because of the action of the reduction drive 78. Typically, the input member of the reduction drive 78 consists of a small sprocket connected to the transverse jackshaft 92 and coupled to drive an output member consisting of a larger sprocket connected to the drive axle 90 through a driving chain, all enclosed within the housing of the reduction drive 78.

It is contemplated that the driving pulley 80 could be coupled to an engine shaft other than the crankshaft 57, such as an output shaft, a counterbalance shaft, or a power take-off shaft driven by and extending from the engine 24. The shaft driving the driving pulley 80 is therefore generally referred to as the driving shaft. Although the present embodiment is being described with the crankshaft 57 being the driving shaft, it should be understood that other shafts are contemplated. Similarly, it is contemplated that the driven pulley 88 could be coupled to a shaft other than the transverse jackshaft 92, such as directly to the drive axle 90 or any other shaft operatively connected to the ground engaging element of the vehicle (i.e. the drive track 65 in the case of the snowmobile 10). The shaft driven by the driven pulley 88 is therefore generally referred to as the driven shaft. Although the present embodiment is being described with the transverse jackshaft 92 being the driven shaft, it should be understood that other shafts are contemplated.

Figure 3A:
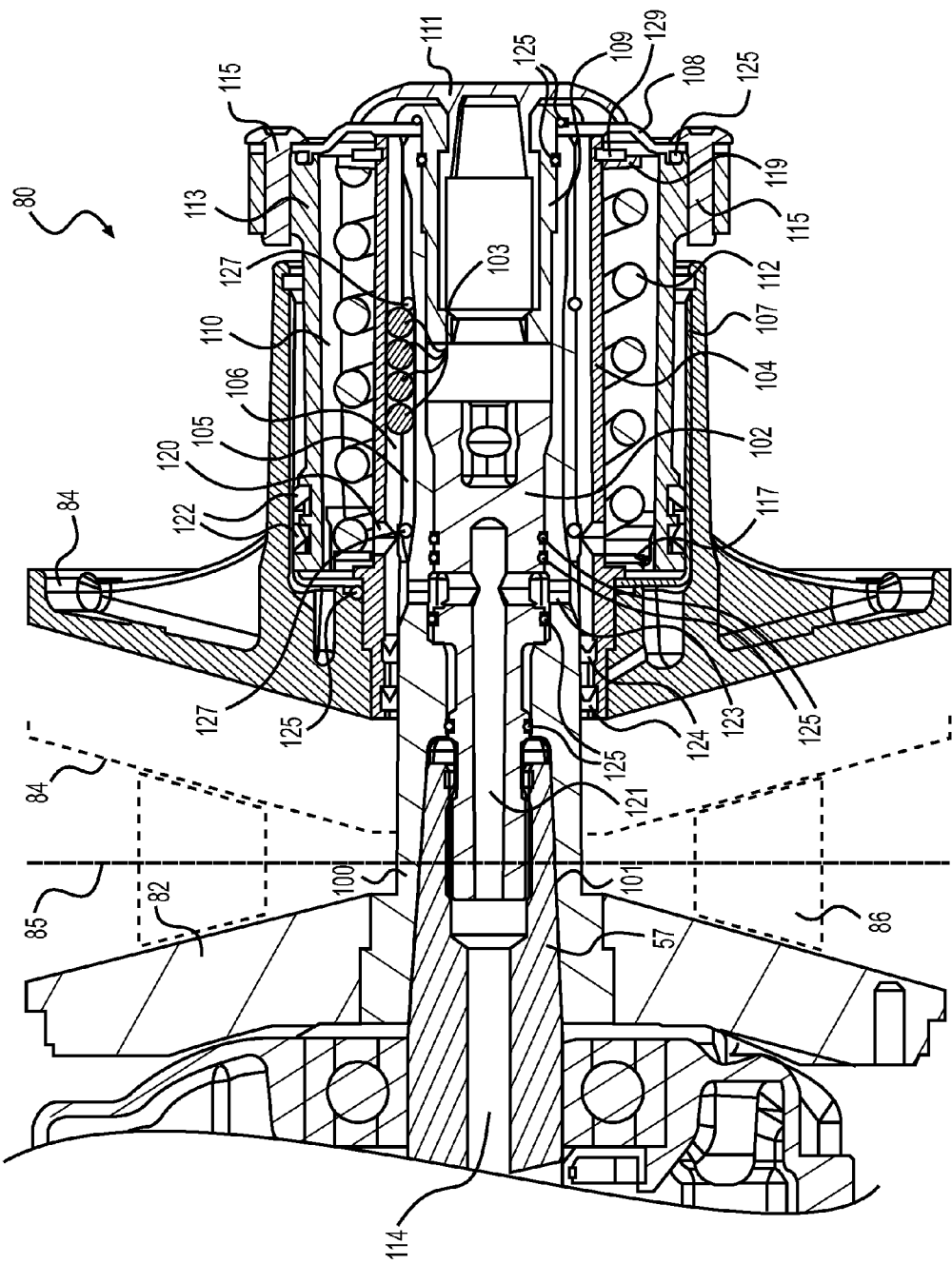
FIG. 3A is a cross-sectional view of a driving pulley of a CVT of the powertrain of FIG. 2.
Figure 3B:
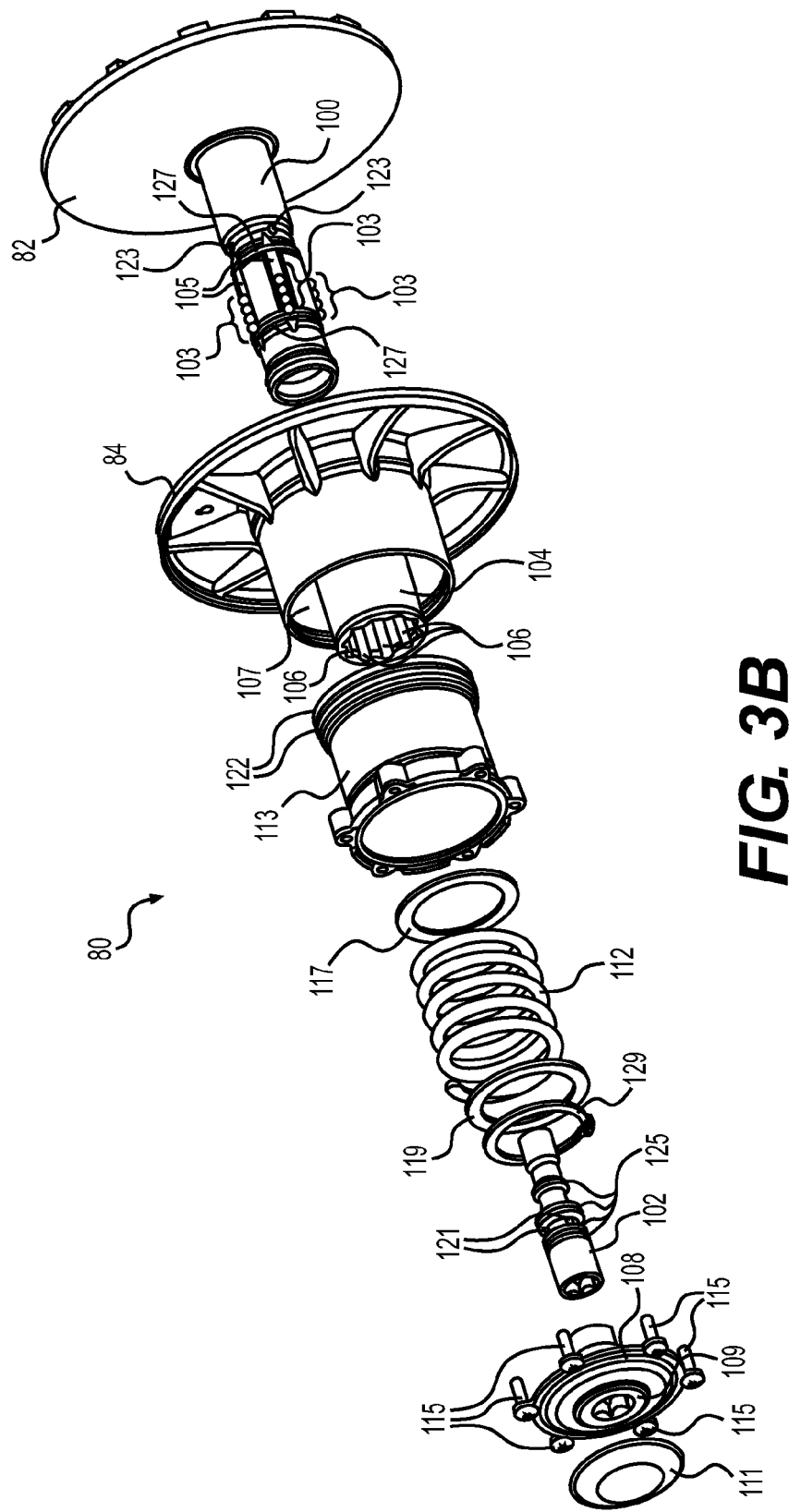
FIG. 3B is an exploded view of the driving pulley of FIG. 3A.

Turning now to FIGS. 3A and 3B, the driving pulley 80 will be described in more detail. As discussed above, the driving pulley 80 includes a pair of opposed frustoconical belt drive sheaves 82 and 84. Both sheaves 82 and 84 rotate together with the crankshaft 57. The sheave 82 is fixed in an axial direction of the crankshaft 57, and is therefore referred to as the fixed sheave 82. The sheave 84 can move toward or away from the fixed sheave 82 in the axial direction of the crankshaft 57 in order to change the drive ratio of the CVT 40, and is therefore referred to as the movable sheave 84. As can be seen in FIG. 2, the fixed sheave 82 is disposed between the movable sheave 84 and the engine 24, however it is contemplated that the movable sheave 84 could be disposed between the fixed sheave 82 and the engine 24.

The fixed sheave 82 is mounted on a shaft 100. A portion 101 of the shaft 100 is taper-fitted on the end of the crankshaft 57 such that the shaft 100 and the fixed sheave 82 rotate with the crankshaft 57. It is contemplated that the shaft 100 could be connected to the crankshaft 57 in other known manners. For example, the shaft 100 could engage the crankshaft 57 via splines. A bolt 102 inserted inside the shaft 100 is screwed inside the end of the crankshaft 57, thus retaining the shaft 100, and therefore the fixed sheave 82, on the crankshaft 57. A sleeve 104 is disposed around the shaft 100. Ball bearings 103 are disposed in axial grooves 105, 106 in the outer surface of the shaft 100 and the inner surface of the sleeve 104 respectively. The ball bearings 103 transfer torque from the shaft 100 to the sleeve 104 such that the sleeve 104 rotates with the shaft 100 while permitting axial movement of the sleeve 104 relative to the shaft 100. Retaining rings 127 disposed on the shaft 100 limit the movement of the ball bearings 103 inside the grooves 105, 106. The movable sheave 84 is mounted on the sleeve 104 such that the movable sheave 84 rotates and moves axially with the sleeve 104, and therefore rotates with the shaft 100 and the crankshaft 57. A sleeve 107 is press-fit inside the movable sheave 84. It is contemplated that the sleeve 107 could be omitted.

An annular cover 108 is retained between the end of the shaft 100 and a flanged head of a bolt 109 so as to rotate with the shaft 100. The bolt 109 is screwed inside the end of the shaft 100. A cap 111 is clipped in the end of the bolt 109. A sleeve 113 is connected to the annular cover 108 by screws 115 and is received axially between portions of the movable sheave 84 and of the sleeve 104.

A CVT chamber 110 is defined between the annular cover 108 and the sleeves 104, 107, and 113. The CVT chamber 110 has an annular cross-section. An inner wall of the CVT chamber 110 is formed by the sleeve 104, an outer wall of the CVT chamber 110 is formed by the sleeve 113, an outer end of the CVT chamber 110 is formed by the annular cover 108, and an inner end of the CVT chamber is formed by the sleeve 107 (or the movable sheave 84 should the sleeve 107 be omitted). A helical spring 112 is disposed inside the CVT chamber 110. One end of the spring 112 abuts a ring 117 abutting the sleeve 113 which is axially fixed relative to the crankshaft 57. The other end of the spring 112 abuts a ring 119 which abuts a clip 129 connected to the sleeve 104 which is axially movable relative to the crankshaft 57. This arrangement of the spring 112 causes the spring 112 to bias the movable sheave 84 away from the fixed sheave 82.

Figure 5:
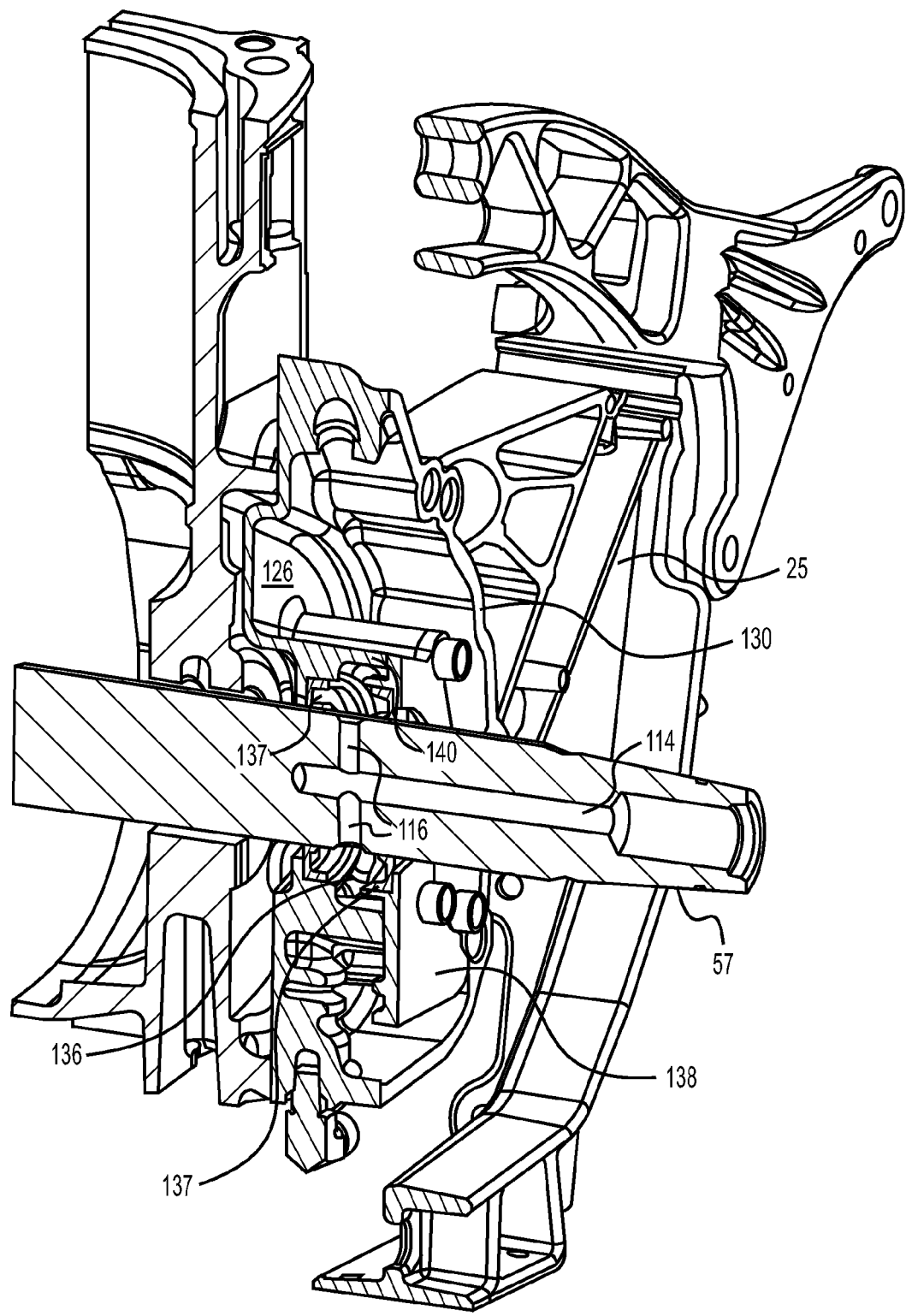
FIG. 5 is a cross-sectional view of the portion of the casing of FIG. 4 taken through line 5-5 of FIG. 4.

As will be explained in greater detail below, hydraulic pressure created by hydraulic fluid supplied to the CVT chamber 110 biases the movable sheave 84 toward the fixed sheave 82 in order to change the drive ratio of the CVT 40. As can be seen in FIG. 5, the crankshaft 57 has an axial passage 114 extending axially therein and two inlet passages 116 extending radially from the axial passage 114 to the outer surface of the crankshaft 57. Although shown as extending perpendicularly and radially from the axial passage 114, it is contemplated that the inlet passages 116 could extend radially at some other angle from the axial passage 114. It is also contemplated that more than two inlet passages 116 or only one inlet passage 116 could be provided. As explained below, a pump 118 (FIG. 6) supplies hydraulic fluid, such as oil for example, to the axial passage 114 of the crankshaft 57 via the inlet passages 116. Returning now to FIG. 3A, from the axial passage 114, the hydraulic fluid flows in a passage 121 defined in the bolt 102. The passage 121 has an axial portion and multiple radially extending outlets. As can be seen in FIG. 3A, when the movable sheave 84 is biased toward the fixed sheave 82 (as illustrated by the movable sheave 84 shown schematically in dotted lines in this figure), a plane 85 passing through a center of the belt 86 intersects the passages 121 and 114 and is disposed laterally between the inlet passages 116 of the crankshaft 57 and the radially extending outlets of the passage 121 of the bolt 102. The hydraulic fluid then flows through passages 123 in the shaft 100, through grooves 105, 106 and through passages 120 in the sleeve 104 into the CVT chamber 110. As the hydraulic pressure increases inside the CVT chamber 110, the movable sheave 84 moves axially toward the fixed sheave 82. When the hydraulic pressure inside the CVT chamber 110 is reduced, as will be described below, the bias of the spring 112 causes the movable sheave 84 to move axially away from the fixed sheave 82 and the hydraulic fluid flows out of the CVT chamber 110 in the direction opposite to what has been described above.

Seals 122 disposed between the sleeve 113 and the sleeve 107, seals 124 disposed between the shaft 100 and the sleeve 104, and various O-rings 125 prevent hydraulic fluid from leaking out of the driving pulley 80.

By having the hydraulic fluid supplied to the CVT chamber 110 via a driving shaft extending from the engine 24, the belt 86 can easily be removed from the pulleys 80, 88 for maintenance or replacement since no portion of the hydraulic system of the CVT 40 extends on a side of the CVT 40 opposite the side on which the engine 24 is disposed (i.e. the belt 86 is removed over the movable sheave 84 from a side of the driving pulley 84 opposite the side from which hydraulic fluid enters the driving pulley 84).

Turning now to FIGS. 4 to 8, the hydraulic system supplying hydraulic fluid to the CVT chamber 110 will be described. Although, the system will be described with respect to these figures, for simplicity of understanding, reference can be made to FIG. 9 which provides a diagrammatic representation of the hydraulic system.

The hydraulic system has a first reservoir 126 for holding the hydraulic fluid. The first reservoir 126 is formed between the engine casing 25 and a cover 128 (FIG. 7) sealingly connected to a protruding lip 130 of the engine casing 25. The portion of the engine casing 25 forming the first reservoir 126 is fastened to other portions of the engine casing 25. However it is contemplated that it could be integrally formed with another portion of the engine casing 25, such as the crankcase for example. From the first reservoir 126, the hydraulic fluid flows through a filter 132 located near a bottom of the first reservoir 126 and then flows in a passage 134.

Figure 4:
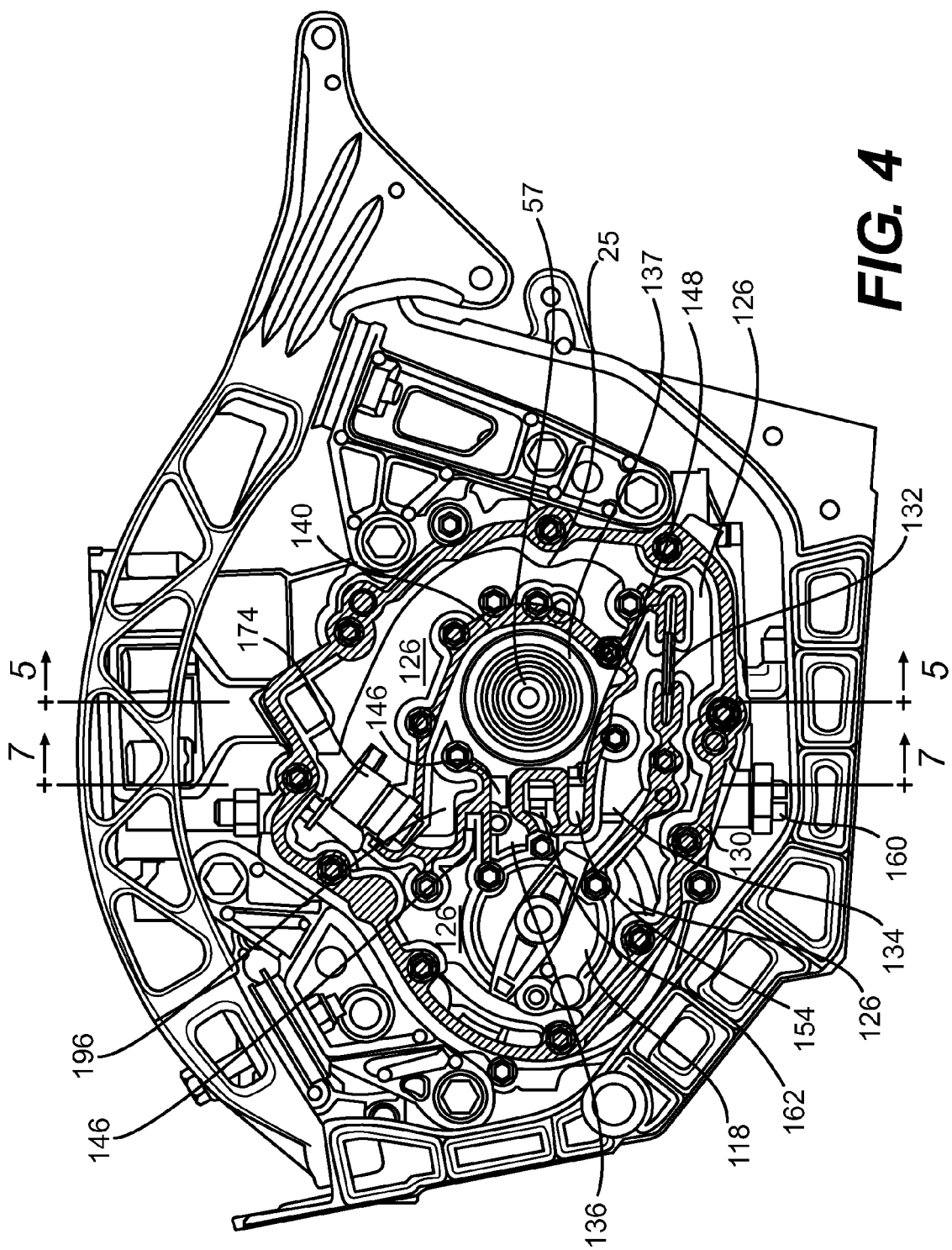
FIG. 4 is an elevation view of a portion of the casing of an engine of the powertrain of FIG. 2 showing elements of a hydraulic system of the CVT.
Figure 6:
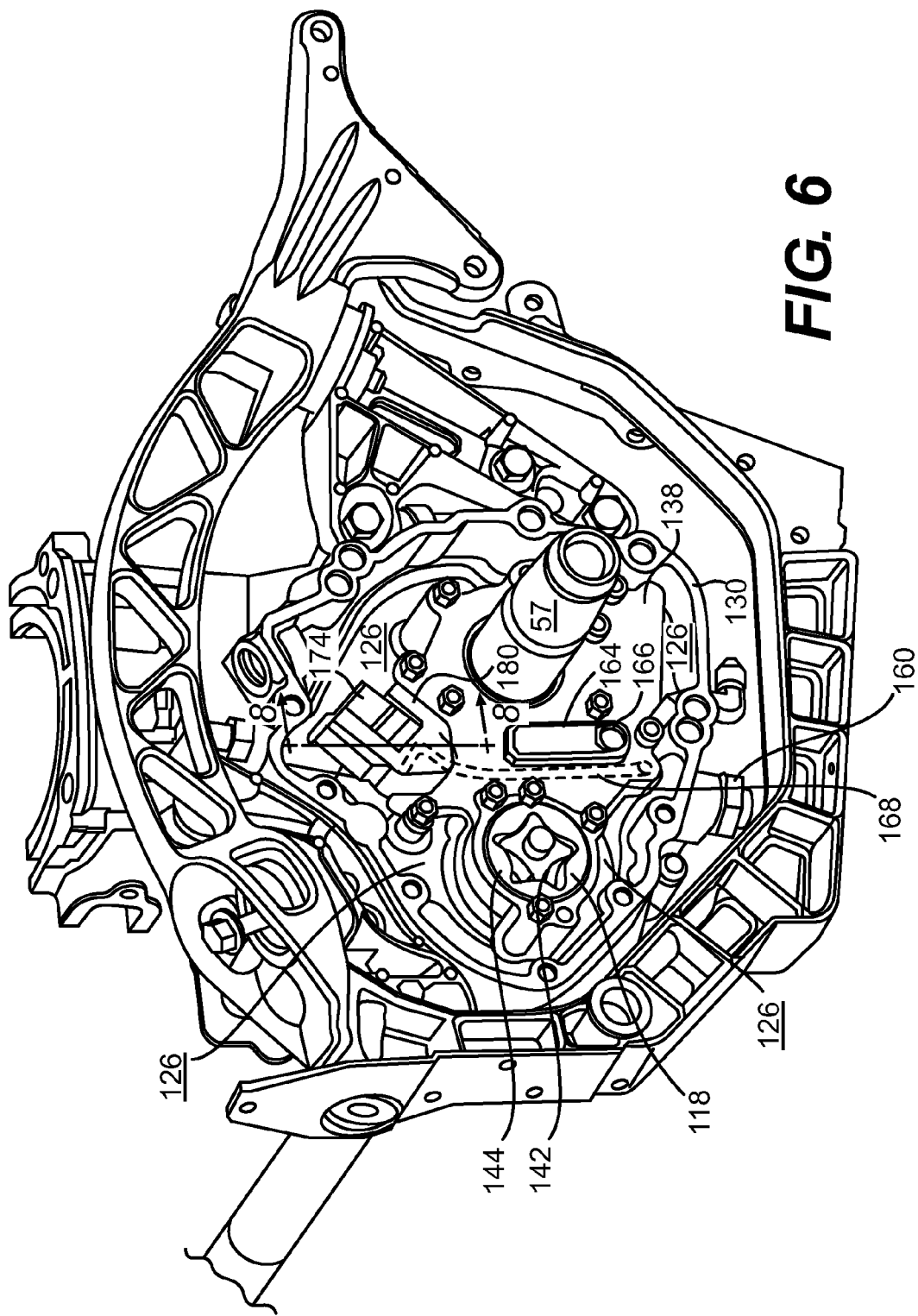
FIG. 6 is a perspective view of the portion of the casing of FIG. 4 with an inner reservoir cover mounted to the casing.

From the passage 134, the hydraulic fluid enters the pump 118 and flows out of the pump 118 into a second reservoir (or canal) 136. The second reservoir 136 is formed between the engine casing 25 and a cover 138 (best seen in FIG. 6) sealingly connected to a protruding lip 140 of the engine casing 25. As best seen in FIG. 4, the second reservoir 136 surrounds the crankshaft 57, and the first reservoir 126 surrounds the second reservoir 136. As can be seen in FIG. 2B, the cover 138, and therefore the first and second reservoirs 126, 136 and the pump 118, are disposed on a same side of the longitudinal centerline 61. As can also be seen in FIG. 2B, the cover 138, and therefore the first and second reservoirs 126, 136 and the pump 118, are disposed forwardly of the jackshaft 92 and airbox 95 and are disposed rearwardly of the pre-muffler 93. Seals 137 are disposed around the crankshaft 57 on either side of the inlet passages 116 (see FIG. 5). The pump 118 is preferably a gerotor pump driven by the engine 24. As seen in FIG. 6, the gerotor pump consists of an inner rotor 142 disposed off-center from an outer rotor 144, with both rotors 142, 144 rotating when the pump 118 is in operation. It is contemplated that other types of pumps could be used. It is also contemplated that the pump could be driven separately from the engine 24, such as by an electric motor for example. While the pump 118 is operating, the hydraulic pressure inside the second reservoir 136 is normally greater than in the first reservoir 126. A pressure release valve 146 is disposed in a passage in the protruding lip 140 so as to fluidly communicate the second reservoir 136 with the first reservoir 126 should the hydraulic pressure inside the second reservoir 136 become too high. From the second reservoir 136, the hydraulic fluid flows to the inlet passages 116 of the crankshaft 57 and then to the CVT chamber 110 as described above.

Figure 7:
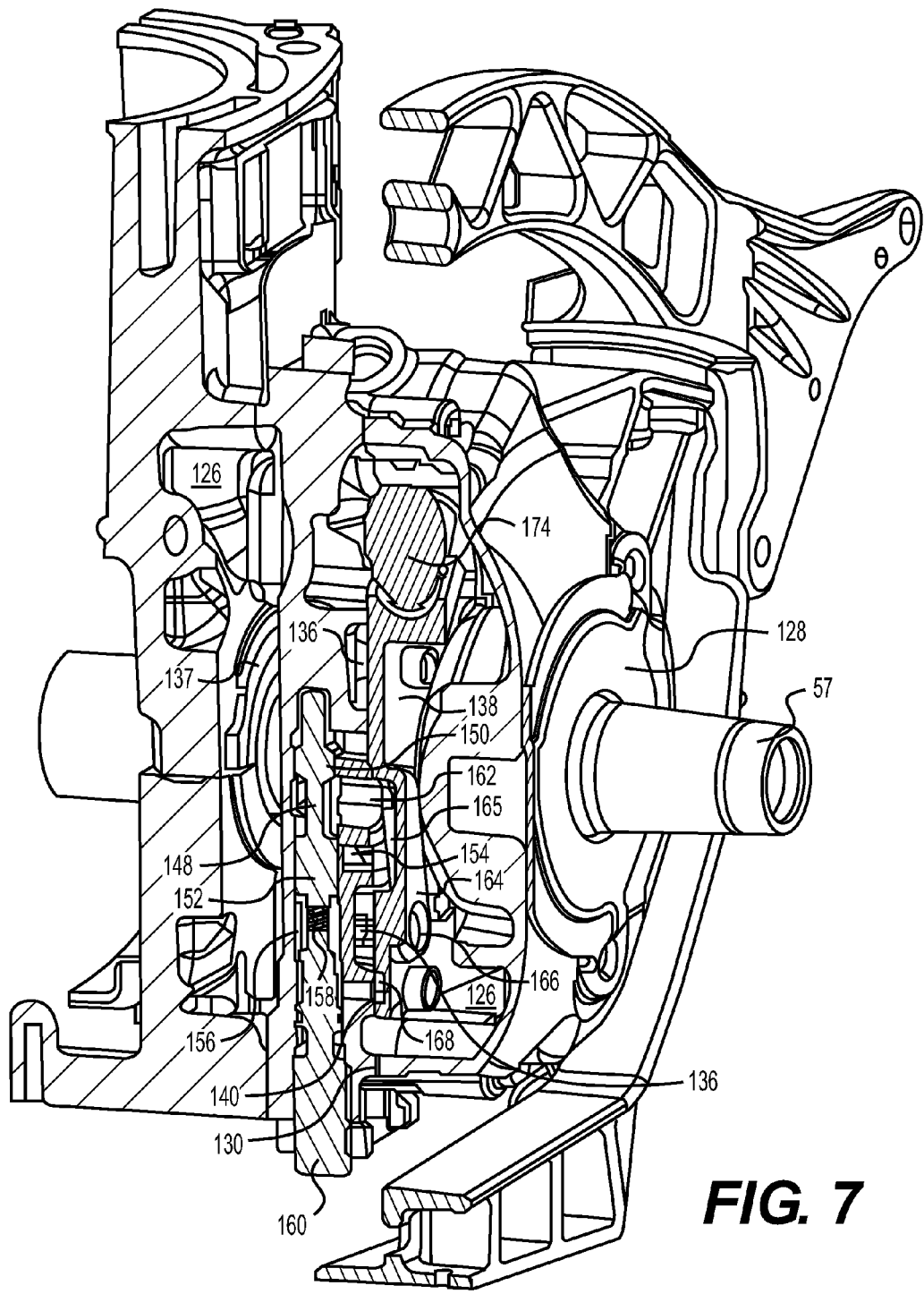
FIG. 7 is a cross-sectional view of the portion of the casing of FIG. 4 taken through line 7-7 of FIG. 4 with the inner reservoir cover and an outer reservoir cover mounted to the casing.

As best seen in FIG. 7, the hydraulic system is provided with a piloted proportional pressure relief valve 148. It is contemplated that a non-piloted valve could be provided instead of the piloted proportional pressure relief valve 148. The piloted proportional pressure relief valve 148 controls fluid communication between the second reservoir 136 and the first reservoir 126 so as to control a hydraulic pressure in the second reservoir 136. By controlling the hydraulic pressure in the second reservoir 136, the hydraulic pressure in the CVT chamber 110 is also controlled, which in turn controls the position of the movable sheave 84 with respect to the fixed sheave 82, and therefore controls the drive ratio of the CVT 40.

The piloted proportional pressure relief valve 148 has a bell-shaped upper end 150 disposed in the second reservoir 136 near an outlet of the pump 118. A lower end 152 of the piloted proportional pressure relief valve 148 closes and opens a passage 154 from the second reservoir. A piloted proportional pressure relief valve chamber 156 is disposed adjacent the lower end 152 of the piloted proportional pressure relief valve 148. The piloted proportional pressure relief valve chamber 156 contains hydraulic fluid. The hydraulic pressure in the piloted proportional pressure relief valve chamber 156 biases the piloted proportional pressure relief valve 148 upwardly toward its closed position (i.e. the position shown in FIG. 7, with the lower end 152 of the piloted proportional pressure relief valve closing the passage 154 completely). The amount of hydraulic pressure in the piloted proportional pressure relief valve chamber 156, and therefore the amount of upward bias on the piloted proportional pressure relief valve, can be controlled as will be described below. A spring 158 is disposed in the piloted proportional pressure relief valve chamber 156 between the lower end 152 of the piloted proportional pressure relief valve and the upper end of a threaded plug 160. The spring 158 also biases the piloted proportional pressure relief valve 148 upwardly toward its closed position. By screwing and unscrewing the threaded plug 160, a degree of preloading of the spring 158 can be adjusted which in turn controls the amount of bias provided by the spring 158. The hydraulic pressure on the bell-shaped upper end 150 biases the piloted proportional pressure relief valve 148 downwardly toward an opened position (i.e. a position where the lower end 152 of the piloted proportional pressure relief valve 148 does not close the passage 154 completely). It should be understood that the piloted proportional pressure relief valve 148 has multiple opened positions each providing a different degree of opening of the passage 154. When the downward force on the piloted proportional pressure relief valve 148 due to the hydraulic pressure acting on the upper end 150 exceeds the upward force on the piloted proportional pressure relief valve 148 due to the hydraulic pressure acting on the lower end 152 and the bias of the spring 158, the piloted proportional pressure relief valve 148 moves downwardly to an opened position.

When the piloted proportional pressure relief valve 148 is in an opened position, hydraulic fluid flows through the passage 154 from the second reservoir 136, to a chamber 162 disposed between the ends 150, 152 of the piloted proportional pressure relief valve 148. From the chamber 162, the hydraulic fluid flows into a return passage 164 (best seen in FIG. 6) to the first reservoir 126. The return passage 164 is formed between the cover 138 and a metal gasket 165 (best seen in FIG. 8) disposed between the cover 138 and the protruding lip 140. The outlet 166 of the return passage 164 is located near the bottom of the first reservoir 126 such that the outlet 166 is disposed below a level of hydraulic fluid in the first reservoir 126, thus reducing the likelihood of air bubbles being formed by the hydraulic fluid flowing into the first reservoir 126 from the return passage 164. Therefore, as the degree of opening of the piloted proportional pressure relief valve 148 is increased, the hydraulic pressure in the second reservoir 136 is reduced, which reduces the hydraulic pressure in the CVT chamber 110, which in turn causes the movable sheave 84 to move away from the fixed sheave 82 due to the bias of the spring 112. As the degree of opening of the piloted proportional pressure relief valve 148 is decreased, the hydraulic pressure in the second reservoir 136 is increased, which increases the hydraulic pressure in the CVT chamber 110, which in turn causes the movable sheave 84 to move toward the fixed sheave 82. Thus, by controlling a degree of opening of the piloted proportional pressure relief valve 148 as described below, the position of the movable sheave 84 with respect to the fixed sheave 82, and therefore the drive ratio of the CVT 40, can be controlled.

Figure 8:
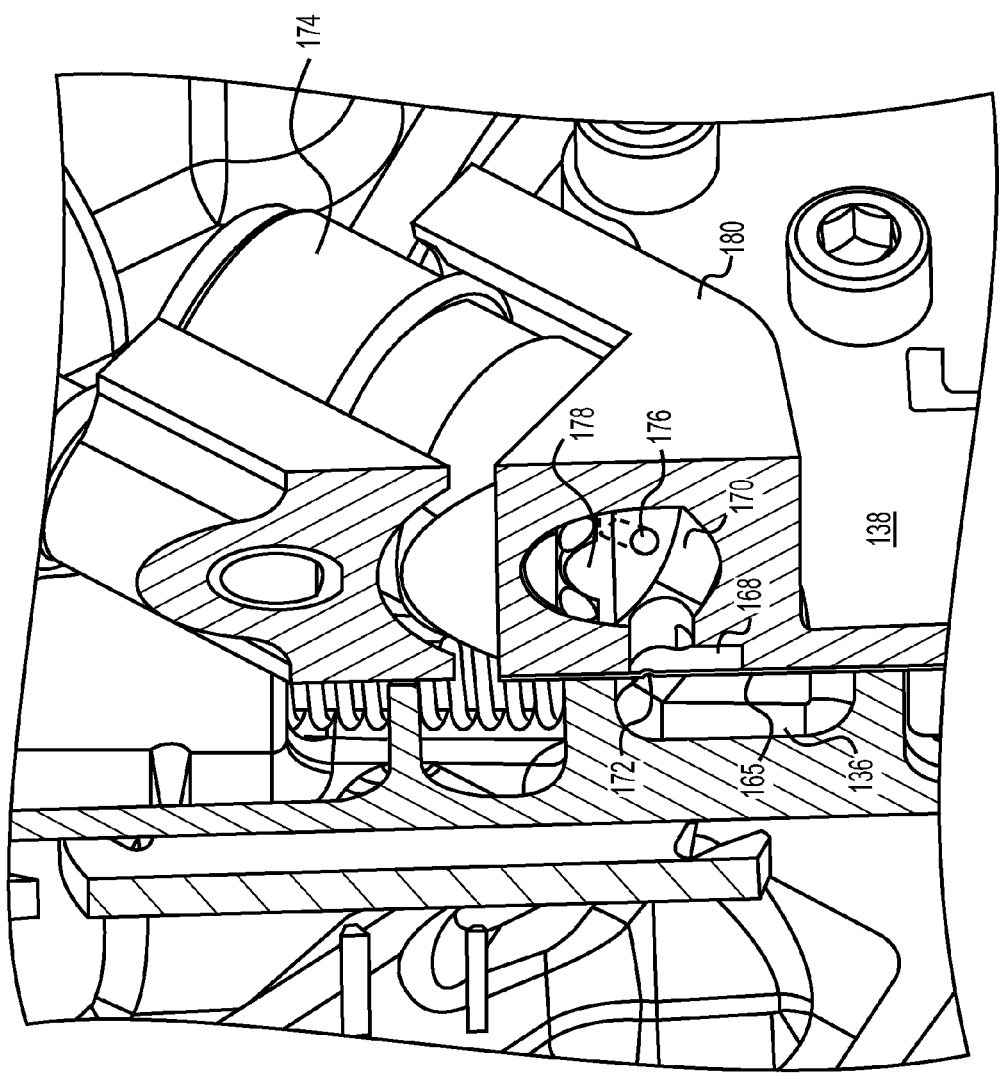
FIG. 8 is a cross-sectional view of the portion of the casing of FIG. 4 taken through line 8-8 of FIG. 6.
Figure 9:
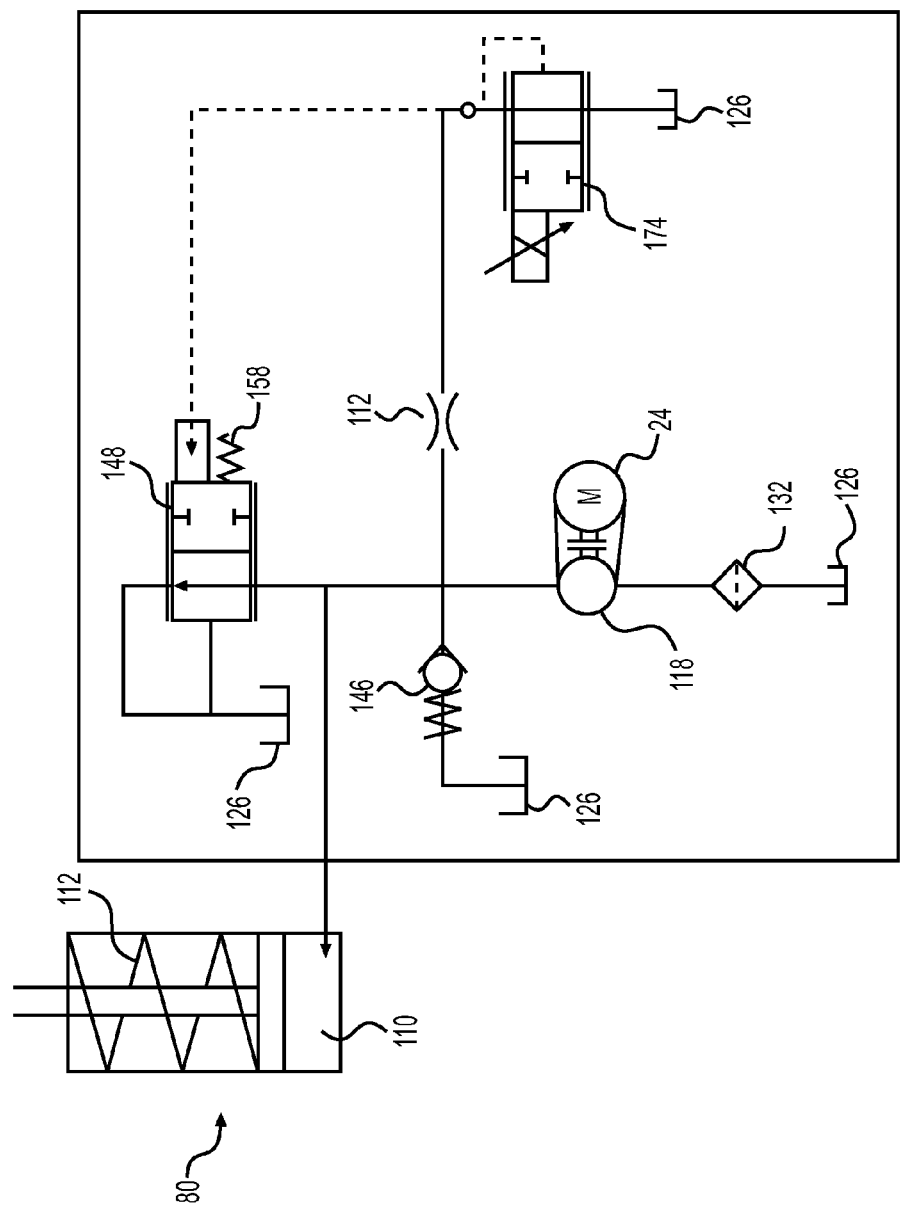
FIG. 9 is a diagram of the hydraulic system for the CVT.

The piloted proportional pressure relief valve chamber 156 fluidly communicates with a piloted proportional pressure relief valve passage 168 (best seen in FIG. 6). The piloted proportional pressure relief valve passage 168 is formed between the cover 138 and the metal gasket 165. The piloted proportional pressure relief valve passage 168 extends upwardly to a pilot valve chamber 170 (FIG. 8). As seen in FIG. 8, an opening 172 in the metal gasket 165 communicates the piloted proportional pressure relief valve passage 168 with the second reservoir 136 such that hydraulic fluid can be supplied from the second reservoir 136 to the piloted proportional pressure relief valve chamber 156 via the piloted proportional pressure relief valve passage 168. An electronically controlled pilot valve in the form of a solenoid 174 is disposed adjacent to the pilot valve chamber 170. It is contemplated that other types of electronically controlled pilot valve could be used. The solenoid 174 is held in a holder 180. A passage 176 in the solenoid fluidly communicates the pilot valve chamber 170 with the first reservoir 126. The solenoid 174 and passage 176 together form an electronically controlled pilot valve. The solenoid 174 modulates the forces applied on a movable end 178 thereof (shown in FIG. 8) in response to a signal received from a control unit 200 (FIG. 10) as described below. The pressure in the pilot valve chamber 170 is then proportional to the force exerted by the solenoid 174 on its movable end 178. The movable end 178 modulates a degree of opening the passage 176 to compensate for the flow variation coming from the reservoir 136 through the opening 172. As explained above, decreasing the hydraulic pressure in the piloted proportional pressure relief valve chamber 156 reduces the upward bias on the piloted proportional pressure relief valve 148 which in turn reduces the hydraulic pressure in the CVT chamber 110, thus causing the sheaves 82, 84 to move away from each other. When the end 178 of the solenoid 174 reduces the degree of opening of the passage 176, hydraulic fluid flowing in the opening 172 from the second reservoir 136 increases the hydraulic pressure in the piloted proportional pressure relief valve chamber 156. As explained above, increasing the hydraulic pressure in the piloted proportional pressure relief valve chamber 156 increases the upward bias on the piloted proportional pressure relief valve 148 which in turn increases the hydraulic pressure in the CVT chamber 110, thus causing the sheaves 82, 84 to move toward each other. Thus, controlling an opening and closing cycle of the end 178 of the solenoid 174, controls an opening and closing cycle of the passage 176, which in turns controls the position of the movable sheave 84 with respect to the fixed sheave 82, and therefore the drive ratio of the CVT 40. The opening 172 has a smaller cross-sectional area than the cross-sectional area of the passage 176 which causes a drop in pressure between the reservoir 136 and the pilot valve chamber 170. In a preferred embodiment, the opening 172 has a circular cross-section having a 0.8 mm diameter, and the passage 176 has a circular cross-section having a 3 mm diameter.

Figure 10:
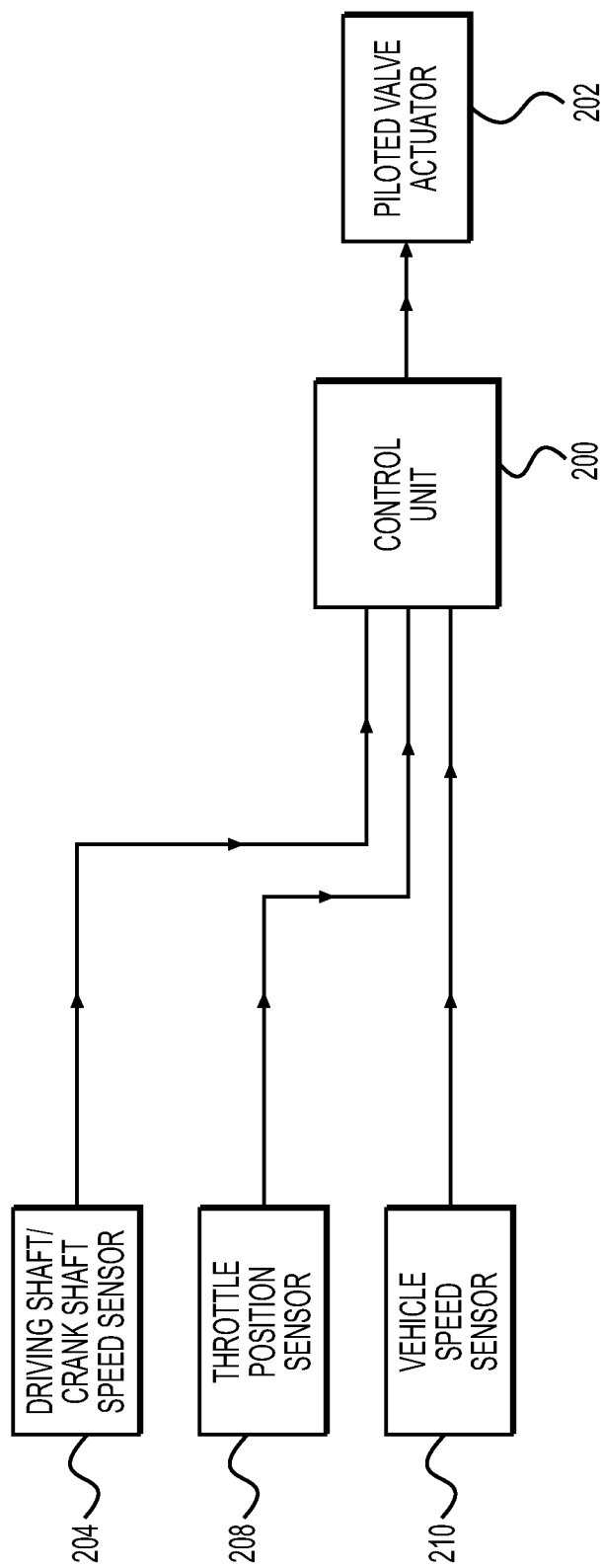
FIG. 10 is a schematic representation of elements of an electronic system of the snowmobile of FIG. 1.

Turning now to FIG. 10, elements of an electronic system of the snowmobile 10 used to control the drive ratio of the CVT 40 will be described. The electronic system includes the control unit 200. The control unit 200 receives signals from a number of sensors (described below), uses these signals to determine a clamping force to be applied to the belt 86, as described in greater detail below, such as to obtain a desired drive ratio of the CVT 40. The clamping force is the force applied on either side of the belt 86 by the sheaves 82, 84 in the axial direction of the crankshaft 57. Based on the clamping force, the control unit 200 sends a signal to a piloted valve actuator 202 to control an opening and closing cycle of the piloted proportional pressure relief valve 148 in order to obtain a hydraulic pressure in the CVT chamber 110 that will provide the clamping force to be applied. The signal sent from the control unit 200 to the piloted valve actuator 202 is preferably a pulse-width modulated (PWM) signal. In the present embodiment, the piloted valve actuator 202 consists of the solenoid 174 which is used to control the hydraulic pressure in the piloted proportional pressure relief valve chamber 156 as described above. However, it is contemplated that other types or arrangements of piloted valve actuators could be used. For example, the piloted valve actuator 202 could be a solenoid mechanically actuating the valve 148.

A driving shaft speed sensor 204 senses a speed of rotation of the crankshaft 57 (or other driving shaft associated with the driving pulley 80) and sends a signal representative of the speed of rotation of the crankshaft 57 to the control unit 200. A throttle position sensor 208 senses a position of the throttle valve 96 and sends a signal representative of this position to the control unit 200. The position of the throttle valve 96 is preferable determined as a percentage of opening of the throttle valve 96 (0% being a fully closed position and 100% being a fully opened position), however it is contemplated that the position of the throttle valve 96 could be determined in terms of degrees of opening or any other suitable terms. A vehicle speed sensor 210 senses a speed of the snowmobile 10 and sends a signal representative of this speed to the control unit 200. The control unit 200 determines the speed of rotation of the driven shaft (i.e. the jackshaft 92) from the signal received from the speed sensor 210. It is contemplated that driven shaft speed sensor could be provided to sense a speed of rotation of the driven shaft and send a signal representative of the speed of rotation of the driven shaft to the control unit 200. The above sensors 204, 208 and 210 could be of any type suitable for their intended purposes, as would be understood by a person skilled in the art. The signals sent from the sensors 204, 208 and 210 to the control unit 200 preferably use a Controller-Area Network (CAN) protocol.

Figure 11:
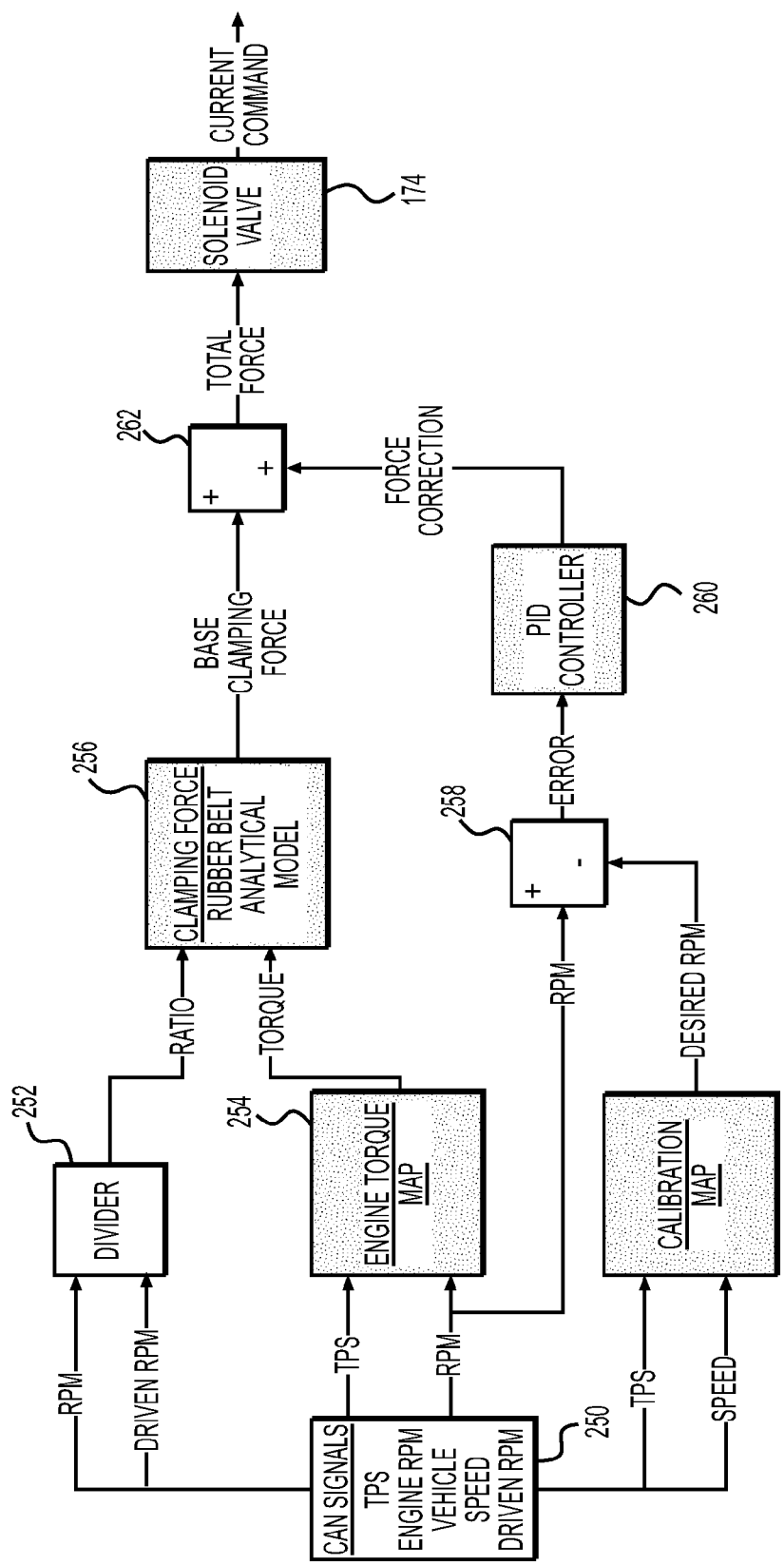
FIG. 11 is a flow chart illustrating a method of controlling the CVT.

Turning now to FIG. 11, the method by which the control unit 200 determines the clamping force to be applied to the belt 86 by the driving pulley 80, and from which the control unit 200 determines the signal to be sent to the solenoid 174

(or other piloted valve actuator 202) will be described. From the signals 250 received from the sensors 204, 208 and 210, the control unit 200 determines the current drive ratio of the CVT 40 by running the speed of rotation of the crankshaft 57 and the speed of rotation of the driven shaft through a divider 252 (i.e. drive ratio=driving speed/driven speed). Therefore, the higher the speed of rotation of the crankshaft 57 (i.e. driving speed) is relative to the speed of rotation of the driven shaft (i.e. driven speed), the higher the drive ratio. A high drive ratio corresponds to a low gear ratio condition. In an exemplary embodiment, a low gear ratio condition corresponds to a drive ratio that is greater than 1. In another exemplary embodiment a low gear ratio condition corresponds to a drive ratio that is between 1 and 3.8. A low drive ratio corresponds to a high gear ratio condition. In an exemplary embodiment, a high gear ratio condition corresponds to a drive ratio that is less than 1. In another exemplary embodiment a high gear ratio condition corresponds to a drive ratio that is between 0.8 and 1. It is contemplated that the control unit 200 could determine the drive ratio of the CVT 40 by using other inputs and methods. For example, the drive ratio of the CVT 40 could be determine by comparing the distance between the sheaves 82, 84 of the driving pulley 80 to the distance between the sheaves 87, 89 of the driven pulley 88. The control unit 200 also determines the engine torque by using the position of the throttle valve 96 and the speed of rotation of the crankshaft 57 together with an engine torque map 254 such as the one shown in FIG. 13. In FIG. 13, the position of the throttle valve 96 appears in terms of percentage of opening of the throttle valve 96. The engine torques given in the table of FIG. 13 are in Newton-meters (Nm). It is contemplated that the control unit 200 could determine the engine torque by using other inputs and methods.

By using the current drive ratio of the CVT 40 and the engine torque determined above, the control unit 200 determines a base clamping force. The determination of the base clamping force is made using an analytical model 256. FIG. 14 shows a clamping force map which was made based on the analytical model. The base clamping forces given in the table of FIG. 14 are in Newtons (N).

The control unit 200 also determines a desired speed of rotation of the crankshaft 57 by using the position of the throttle valve 96 and the speed of the snowmobile 10 together with a calibration map such as one of the ones shown in FIGS. 12A and 12B. The desired speeds of rotation of the crankshaft 57 given in the tables of FIGS. 12A and 12B are in rotations per minute (RPM).

In one embodiment, the driver of the snowmobile 10 can select one of two or more driving modes using a manually actuated switch 62 (FIG. 1), where each driving mode has a corresponding calibration map. The selected driving mode is preferably displayed to the driver on a display cluster (not shown) of the snowmobile 10. For example, in a snowmobile 10 having two driving modes, the calibration map shown in FIG. 12A could correspond to a "fuel economy" mode and the calibration map in FIG. 12B could correspond to a "performance" mode. As their names suggest, the calibration map of FIG. 12A provides good fuel consumption while the calibration map of FIG. 12B provides improved vehicle performances compared to the "fuel economy" mode.

It is contemplated that the control unit 200 could determine the desired speeds of rotation of the crankshaft 57 by using other inputs and methods.

The values given in FIGS. 12A to 14 are for exemplary purposes. It should be understood that these values would vary depending on the vehicle, powertrain, and/or CVT characteristics and the desired performance characteristics of the vehicle. For example, the clamping force values given in the map of FIG. 14 would vary depending on the spring constant of the spring 112.

The control unit 200 then determines a difference (error) between the current speed of rotation of the crankshaft 57 and the desired speed of rotation of the crankshaft 57 determined above by running these values through a comparator 258. This difference is then inserted in a proportional-integral-derivative (PID) controller 260 which determines a corrective clamping force. It is contemplated that the control unit 200 could determine the corrective clamping force by using other types of controllers.

The base clamping force and the corrective clamping force determined above are then added using a summer 262 to obtain a total clamping force. The control unit 200 finally sends a signal to the solenoid 174 controlling a pulse-width-modulation duty cycle which modulates the degree of opening of the passage 176 such that a resulting hydraulic pressure in the CVT chamber 110 will cause the movable sheave 84 to apply the total clamping force to the belt 86, thus controlling the drive ratio of the CVT 40. The total clamping force is lower than the base clamping force when the desired speed of rotation of the crankshaft 57 is higher than the current speed of rotation of the crankshaft 57. The total clamping force is higher than the base clamping force when the desired speed of rotation of the crankshaft 57 is lower than the current speed of rotation of the crankshaft 57.

In the embodiment where the driver of the snowmobile 10 can switch from between the calibration maps of FIGS. 12A and 12B, during operation of the snowmobile 10, switching from the calibration map of FIG. 12B to the calibration map of FIG. 12A will generally result in the speed of rotation of the crankshaft 57 to decrease (since the desired speed of rotation of the crankshaft 57 decreases) and in the total clamping force to increase, thus maintaining the speed of the snowmobile 10.

It is contemplated that the summer 262 could be replaced by a comparator. In such an embodiment, either the inputs to the comparator 258 are inverted or the PID controller 260 has a negative gain.

The calibration map, engine torque map, clamping force map, and the PID controller 260 are preferably set such that once the snowmobile 10 reaches a desired (i.e. constant) speed following an acceleration, the total clamping force can be increased. This allows a speed of rotation of the crankshaft 57 to be reduced while still maintaining the speed of the snowmobile 10 constant. It is contemplated that, depending on the engine configuration, a degree of opening of the throttle valve 96 may have to be increased in order to maintain the speed of the snowmobile 10 constant. This results in improved fuel consumption compared to a snowmobile having a centrifugal CVT.

It is contemplated that the calibration map, engine torque map, clamping force map, and the PID controller 260 could also be set such that as the position of the throttle valve 96 decreases, a rate of reduction of the total clamping force is lower than a rate of reduction of the position of the throttle valve 96 which causes engine braking.

In one embodiment, during a low gear ratio condition, the total clamping force determined by the control unit 200 as described above and being applied to the belt 86 by the movable sheave 84 is less than a clamping force necessary to cause the belt 86 to rotate synchronously with the driving pulley 80. As a result, during the low gear ratio condition, the speed of rotation of the driving pulley 80 is greater than the speed of rotation of the belt 86 and the belt 86 slips relative to the driving pulley 80. As the drive ratio decreases, the difference in rotation speed between the driving pulley 80 and the belt 86 also decreases. During the low gear ratio condition, the belt 86 continues to rotate synchronously with the driven pulley 88. Alternatively, instead of applying a total clamping force that is less than a clamping force necessary to cause the belt 86 to rotate synchronously with the driving pulley 80 during a low gear ratio condition, it is contemplated that a total clamping force that is less than a clamping force necessary to cause the belt 86 to rotate synchronously with the driving pulley 80 could be applied when the snowmobile 10 is operating at low speeds. In an exemplary embodiment, a low vehicle speed corresponds to a vehicle speed of less than 20 km/h.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A method of controlling a hydraulic continuously variable transmission of a vehicle; the continuously variable transmission including a driving pulley disposed on a driving shaft for rotation therewith, a driven pulley disposed on a driven shaft for rotation therewith, and a belt operatively connecting the driving pulley with the driven pulley; the driving pulley including a fixed sheave, a movable sheave, and a spring biasing the movable sheave away from the fixed sheave; the driving shaft being driven by an engine of the vehicle; the method comprising:
   determining a drive ratio of the continuously variable transmission; and
   controlling a hydraulic pressure applied to the movable sheave to apply a total clamping force onto the belt that is less than a clamping force necessary to cause the belt to rotate synchronously with the driving pulley when the drive ratio corresponds to a low gear ratio condition.

2. The method of claim 1, wherein determining the drive ratio includes:
   determining a speed of rotation of the driving shaft; and
   determining a speed of rotation of the driven shaft;
   the drive ratio being a ratio of the speed of rotation of the driving shaft versus the speed of rotation of the driven shaft.

3. The method of claim 1, wherein when the drive ratio corresponds to the low gear ratio condition, a speed of rotation of the driving pulley is greater than a speed of rotation of the belt and the belt slips relative to the driving pulley.

4. The method of claim 3, wherein a difference in rotation speed between the driving pulley and the belt decreases as the drive ratio decreases.

5. The method of claim 1, wherein when the drive ratio corresponds to the low gear ratio condition, the belt rotates synchronously with the driven pulley.

6. The method of claim 1 further comprising:
   determining an engine torque;
   determining a base clamping force to be applied by the driving pulley onto the belt based on the drive ratio and the engine torque;
   determining a desired speed of rotation of the driving shaft; and
   determining a corrective clamping force by comparing the speed of rotation of the driving shaft to the desired speed of rotation of the driving shaft;
   wherein the total clamping force is a sum of the base clamping force and the corrective clamping force.

7. The method of claim 6, further comprising determining a position of a throttle valve of the engine; wherein the engine torque is determined using a map based on the position of the throttle valve and the speed of rotation of the driving shaft.

8. The method of claim 6, wherein the corrective clamping force is determined using a proportional-integral-derivative controller.

9. The method of claim 6, further comprising:
   determining a position of a throttle valve of the engine; and
   determining a speed of the vehicle;
   wherein the desired speed of rotation of the driving shaft is determined using a calibration map based on the position of the throttle valve and the speed of the vehicle.

10. The method of claim 6, wherein the driving pulley includes a CVT chamber and the vehicle includes a hydraulic fluid reservoir and a pump, the pump supplying hydraulic fluid to the CVT chamber, and hydraulic pressure in the CVT chamber biasing the movable sheave toward the fixed sheave; and
   wherein controlling a hydraulic pressure applied to the movable sheave includes controlling a position of a proportional pressure relief valve controlling fluid communication between the CVT chamber and the reservoir.

11. A vehicle comprising:
   a frame;
   an engine mounted to the frame, the engine having a throttle valve controlling a flow of air to the engine;
   a ground engaging element mounted to the frame for propelling the vehicle;
   a driving shaft extending from the engine and being driven by the engine;
   a driven shaft operatively connected to ground engaging element for driving the ground engaging element;
   a hydraulic fluid reservoir;
   a pump fluidly communicating with the reservoir;
   a continuously variable transmission operatively connecting the driving shaft with the driven shaft, the continuously variable transmission including:
      a driving pulley disposed on the driving shaft for rotation therewith;
      a driven pulley disposed on the driven shaft for rotation therewith; and
      a belt operatively connecting the driving pulley with the driven pulley,
      the driving pulley including:
         a fixed sheave disposed on the driving shaft for rotation therewith;
         a movable sheave disposed on the driving shaft for rotation therewith, the belt being disposed between the fixed sheave and the movable sheave;
         a spring biasing the movable sheave away from the fixed sheave; and
         a CVT chamber fluidly communicating with the pump, the pump supplying hydraulic fluid from the reservoir to the CVT chamber to create a hydraulic pressure in the CVT chamber, and the hydraulic pressure in the CVT chamber biasing the movable sheave toward the fixed sheave; and
   a control unit determining a hydraulic pressure to be created in the CVT chamber,
   the hydraulic pressure determined by the control unit causing the movable sheave to apply a total clamping force onto the belt that is less than a clamping force necessary to cause the belt to rotate synchronously with the driving pulley when a drive ratio of the continuously variable transmission corresponds to a low gear ratio condition.

12. The vehicle of claim 11, wherein when the drive ratio corresponds to the low gear ratio condition, a speed of rotation of the driving pulley is greater than a speed of rotation of the belt and the belt slips relative to the driving pulley.

13. The vehicle of claim 12, wherein a difference in rotation speed between the driving pulley and the belt decreases as the drive ratio decreases.

14. The vehicle of claim 11, wherein when the drive ratio corresponds to the low gear ratio condition, the belt rotates synchronously with the driven pulley.

15. The vehicle of claim 11, further comprising:
   a proportional pressure relief valve selectively communicating the CVT chamber with the reservoir;
   a valve actuator operatively associated with the proportional pressure relief valve for controlling a position of the proportional pressure relief valve, the control unit being electronically connected to the valve actuator, the control unit sending a signal to the valve actuator to control the position of the proportional pressure relief valve;
   a driving shaft speed sensor electronically communicating with the control unit, the driving shaft speed sensor sending a signal representative of a speed of rotation of the driving shaft to the control unit;
   a throttle position sensor electronically communicating with the control unit, the throttle position sensor sending a signal representative of a position of the throttle valve to the control unit;
   a vehicle speed sensor electronically communicating with the control unit, the vehicle speed sensor sending a signal representative of a speed of the vehicle to the control unit, the control unit determining a speed of rotation of the driven shaft based on the signal received from the vehicle speed sensor;
   the control unit determining an engine torque based on the signals received from the driving shaft speed sensor and the throttle position sensor,
   the control unit determining a desired speed of rotation of the driving shaft based on the signals received from the throttle position sensor and the vehicle speed sensor,
   the control unit determining a base clamping force to be applied by the driving pulley onto the belt based on the engine torque and a ratio of the speed of rotation of the driving shaft versus the speed of rotation of the driven shaft,
   the control unit determining a corrective clamping force by comparing the speed of rotation of the driving shaft to the desired speed of rotation of the driving shaft,
   the signal from the control unit to the valve actuator to control the position of the proportional pressure relief valve being based on a sum of the base clamping force and the corrective clamping force, the sum corresponding to the total clamping force.

16. The vehicle of claim 11, wherein the driving shaft is a crankshaft of the engine.

17. The vehicle of claim 11, wherein the belt is made of a non-metallic material and has a generally V-shaped cross-section.

18. The vehicle of claim 11, wherein the driven pulley includes a torque sensitive mechanism.

19. A method of controlling a hydraulic continuously variable transmission of a vehicle; the continuously variable transmission including a driving pulley disposed on a driving shaft for rotation therewith, a driven pulley disposed on a driven shaft for rotation therewith, and a belt operatively connecting the driving pulley with the driven pulley; the driving pulley including a fixed sheave, a movable sheave, and a spring biasing the movable sheave away from the fixed sheave; the driving shaft being driven by an engine of the vehicle; the method comprising:
   determining a vehicle speed; and
   controlling a hydraulic pressure applied to the movable sheave to apply a total clamping force onto the belt that is less than a clamping force necessary to cause the belt to rotate synchronously with the driving pulley when the vehicle speed corresponds to a low vehicle speed.

20. The method of claim 19, wherein when the vehicle speed corresponds to the low vehicle speed, a speed of rotation of the driving pulley is greater than a speed of rotation of the belt and the belt slips relative to the driving pulley.

21. The method of claim 19, wherein when the vehicle speed corresponds to the low vehicle speed, the belt rotates synchronously with the driven pulley.

* * * * *